US010423997B2

(12) United States Patent
MacDonald Korth et al.

(10) Patent No.: US 10,423,997 B2
(45) Date of Patent: *Sep. 24, 2019

(54) SYSTEM, PROGRAM PRODUCT, AND METHODS FOR ONLINE IMAGE HANDLING

(71) Applicant: Overstock.com, Inc., Salt Lake City, UT (US)

(72) Inventors: Holly C. MacDonald Korth, Salt Lake City, UT (US); Samuel Jacob Peterson, Salt Lake City, UT (US)

(73) Assignee: Overstock.com, Inc., Midvale, UT (US)

( * ) Notice: Subject to any disclaimer, the term of this patent is extended or adjusted under 35 U.S.C. 154(b) by 359 days.

This patent is subject to a terminal disclaimer.

(21) Appl. No.: 13/903,819

(22) Filed: May 28, 2013

(65) Prior Publication Data

US 2014/0164168 A1    Jun. 12, 2014

Related U.S. Application Data

(62) Division of application No. 13/181,016, filed on Jul. 12, 2011, now Pat. No. 8,452,691, which is a division
(Continued)

(51) Int. Cl.
*G06Q 40/00*    (2012.01)
*G06Q 30/06*    (2012.01)
(Continued)

(52) U.S. Cl.
CPC ......... *G06Q 30/0621* (2013.01); *G06Q 10/06* (2013.01); *G06Q 30/0601* (2013.01);
(Continued)

(58) Field of Classification Search
CPC .... G06Q 30/08; G06Q 30/0601; G06Q 30/06; G06Q 30/0641; G06Q 40/04; G06Q 40/00
(Continued)

(56) References Cited

U.S. PATENT DOCUMENTS 3,573,747 A    4/1971 Adams et al.
3,581,072 A    5/1971 Nymeyer
(Continued)

FOREIGN PATENT DOCUMENTS

CA    2253543    10/1997
CA    2347812    5/2000
(Continued)

OTHER PUBLICATIONS

Anonymous "Image manipulation. (image-editing software and image-manipulation systems)(Seybold Special Report, Part II)" May 15, 1995 Seybold Report on Publishing Systems, v24, n18, p. S35(9).*
(Continued)

*Primary Examiner* — Kelly S Campen
(74) *Attorney, Agent, or Firm* — Clayton Howarth, P.C.

(57) ABSTRACT

Electronic commerce over a computer network is facilitated by a computer system that forms a community of computers that enable the users to buy and sell items in an online marketplace. To list the item on an online marketplace website, for example, the selling user posts an item with a seller marketplace item management website by completing an online-item marketplace item creation form. The form requires input related to the item, such as a description, sale price or minimum bid, shipping instructions, and the like, and an image file or image file location illustrating the marketplace item. The seller marketplace item management server provides a marketplace administrator server the mar-
(Continued)

ketplace item data including original image file or image file location. The server contains a random image size generator that generates at least two additional images of the marketplace item for display in a seller marketplace item web page to advertise the marketplace item.

5 Claims, 22 Drawing Sheets

Related U.S. Application Data of application No. 11/524,985, filed on Sep. 21, 2006, now Pat. No. 7,979,340.

(60) Provisional application No. 60/719,673, filed on Sep. 21, 2005.

(51) Int. Cl.
    *G06Q 10/06*     (2012.01)
    *G06Q 40/04*     (2012.01)

(52) U.S. Cl.
    CPC ..... *G06Q 30/0631* (2013.01); *G06Q 30/0643* (2013.01); *G06Q 40/04* (2013.01)

(58) Field of Classification Search
    USPC ... 705/37, 27, 3, 36 R, 26.5, 26.7, 26.1, 1.1, 705/7.11, 7.29, 14.1, 26.3, 27.1
    See application file for complete search history.

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A * | 4/1994 | Rogan et al. ............... 705/33 |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,970,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A * | 9/1999 | DeLorme et al. ............ 701/426 |
| 5,948,061 A | 9/1999 | Merriman et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A * | 5/2000 | Hess et al. .................... 709/219 |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |

(56) References Cited

U.S. PATENT DOCUMENTS

| | | |
|---|---|---|
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,908 B1 | 3/2002 | Brown et al. |
| 6,366,899 B1 | 4/2002 | Kernz |
| 6,370,527 B1 | 4/2002 | Singhai |
| 6,373,933 B1 | 4/2002 | Sarkki et al. |
| 6,374,260 B1 | 4/2002 | Hoffert et al. |
| 6,381,410 B1 | 4/2002 | Amidhozour et al. |
| 6,415,320 B1 | 7/2002 | Hess et al. |
| 6,434,556 B1 | 8/2002 | Levin et al. |
| 6,456,307 B1* | 9/2002 | Bates et al. ............. 715/838 |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,701,310 B1 | 3/2004 | Sugiura et al. |
| 6,718,536 B2 | 4/2004 | Dupaquis |
| 6,728,704 B2 | 4/2004 | Mao et al. |
| 6,732,161 B1 | 5/2004 | Hess et al. |
| 6,732,162 B1 | 5/2004 | Wood et al. |
| 6,856,963 B1 | 2/2005 | Hurwitz |
| 6,889,054 B2 | 5/2005 | Himmel et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,254,547 B1 | 8/2007 | Beck et al. |
| 7,340,249 B2 | 3/2008 | Moran et al. |
| 7,349,668 B2 | 3/2008 | Ilan et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,401,025 B1 | 7/2008 | Lokitz |
| 7,454,464 B2 | 11/2008 | Puthenkulam et al. |
| 7,493,521 B1 | 2/2009 | Li et al. |
| 7,496,582 B2 | 2/2009 | Farnham et al. |
| 7,552,067 B2 | 6/2009 | Nephew et al. |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,912,748 B1 | 3/2011 | Rosenberg et al. |
| 7,983,950 B2 | 7/2011 | DeVita |
| 8,112,303 B2 | 2/2012 | Eglen et al. |
| 2001/0034667 A1 | 10/2001 | Petersen |
| 2001/0034668 A1* | 10/2001 | Whitworth ............. 705/27 |
| 2001/0044751 A1 | 11/2001 | Pugliese et al. |
| 2001/0047290 A1 | 11/2001 | Petras et al. |
| 2001/0051996 A1 | 12/2001 | Cooper et al. |
| 2002/0002513 A1 | 1/2002 | Chiasson |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1* | 3/2002 | Meehan et al. ............. 705/37 |
| 2002/0042738 A1 | 4/2002 | Srinivasan et al. |
| 2002/0099602 A1 | 7/2002 | Moskowitz et al. |
| 2002/0107718 A1 | 8/2002 | Morrill et al. |
| 2002/0120537 A1 | 8/2002 | Morea et al. |
| 2002/0129282 A1 | 9/2002 | Hopkins |
| 2002/0147625 A1 | 10/2002 | Kolke |
| 2002/0161648 A1 | 10/2002 | Mason et al. |
| 2002/0198784 A1 | 12/2002 | Shaak et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0036914 A1 | 2/2003 | Fitzpatrick et al. |
| 2003/0041008 A1* | 2/2003 | Grey et al. .............. 705/37 |
| 2003/0046149 A1 | 3/2003 | Wong |
| 2003/0069740 A1 | 4/2003 | Zeidman |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0110100 A1 | 6/2003 | Wirth, Jr. |
| 2003/0131095 A1 | 7/2003 | Kumhyr et al. |
| 2003/0139969 A1 | 7/2003 | Scroggie et al. |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2004/0006509 A1 | 1/2004 | Mannik et al. |
| 2004/0015416 A1* | 1/2004 | Foster et al. ............. 705/27 |
| 2004/0044563 A1 | 3/2004 | Stein |
| 2004/0055017 A1 | 3/2004 | Delpuch et al. |
| 2004/0078388 A1 | 4/2004 | Melman |
| 2004/0117242 A1 | 6/2004 | Conrad et al. |
| 2004/0128183 A1 | 7/2004 | Challey et al. |
| 2004/0128320 A1 | 7/2004 | Grove et al. |
| 2004/0172379 A1 | 9/2004 | Mott et al. |
| 2004/0174979 A1 | 9/2004 | Hutton et al. |
| 2004/0199496 A1 | 10/2004 | Liu et al. |
| 2004/0204991 A1* | 10/2004 | Monahan et al. ............. 705/14 |
| 2004/0249727 A1 | 12/2004 | Cook, Jr. et al. |
| 2005/0021666 A1 | 1/2005 | Dinnage et al. |
| 2005/0038733 A1* | 2/2005 | Foster et al. ............. 705/37 |
| 2005/0044254 A1 | 2/2005 | Smith |
| 2005/0060664 A1 | 3/2005 | Rogers |
| 2005/0097204 A1 | 5/2005 | Horowitz et al. |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0198031 A1 | 9/2005 | Pezaris et al. |
| 2005/0203888 A1 | 9/2005 | Woolsey et al. |
| 2006/0009994 A1 | 1/2006 | Hogg et al. |
| 2006/0010105 A1 | 1/2006 | Sarukkai et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1* | 3/2006 | MacDonald Korth et al. ............. 705/26 |
| 2006/0085251 A1 | 4/2006 | Greene |
| 2006/0173817 A1 | 8/2006 | Chowdhury et al. |
| 2006/0206479 A1 | 9/2006 | Mason |
| 2006/0259360 A1 | 11/2006 | Flinn et al. |
| 2006/0271671 A1 | 11/2006 | Hansen |
| 2007/0073641 A1 | 3/2007 | Perry et al. |
| 2007/0078726 A1 | 4/2007 | MacDonald Korth et al. |
| 2007/0100803 A1 | 5/2007 | Cava |
| 2007/0162379 A1 | 7/2007 | Skinner |
| 2007/0192181 A1 | 8/2007 | Asdourian |
| 2007/0206606 A1 | 9/2007 | Coleman et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2008/0052152 A1 | 2/2008 | Yufik |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |

(56) References Cited

U.S. PATENT DOCUMENTS

| | | |
|---|---|---|
| 2008/0201218 A1 | 8/2008 | Broder et al. |
| 2008/0288338 A1 | 11/2008 | Wiseman et al. |
| 2009/0006190 A1 | 1/2009 | Lucash et al. |
| 2009/0030755 A1 | 1/2009 | Altberg et al. |
| 2009/0106127 A1 | 4/2009 | Purdy et al. |
| 2009/0204848 A1 | 8/2009 | Kube et al. |
| 2009/0240582 A1 | 9/2009 | Sheldon-Neal et al. |
| 2010/0094673 A1 | 4/2010 | Lobo et al. |
| 2011/0060621 A1 | 3/2011 | Weller et al. |
| 2011/0153383 A1 | 6/2011 | Bhattacharjya et al. |
| 2011/0271204 A1 | 11/2011 | Jones et al. |

FOREIGN PATENT DOCUMENTS

| | | |
|---|---|---|
| EP | 0636993 | 4/1999 |
| EP | 0807891 | 5/2000 |
| EP | 1241603 | 3/2001 |
| JP | 2001283083 | 10/2001 |
| WO | 97/17663 | 5/1997 |
| WO | 98/32289 | 7/1998 |
| WO | 98/47082 | 10/1998 |
| WO | 99/59283 | 11/1999 |
| WO | 00/25218 | 5/2000 |

OTHER PUBLICATIONS

Rose, Phil "Vendors strive to undo Adobe lock-hold." Feb 5 , 1996 Computer Reseller News , n669 , p. 71(7).*

"Mediappraise: Mediappraise Receives National Award for Web-Based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

metails.com, www.metails.com homepage, printed Oct. 13, 2004.

Neches, "FAST—A Research Project in Electronic Commerce," Electronic Markets—The International Journal, Oct. 1993, 4 pages, vol. 3, No. 3.

Neo, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets—The International Journal, Oct. 1993, 2 pages, vol. 3, No. 3.

"Onsale: Onsale Brings Thrill of Auctions and Bargain Hunting Online: Unique Internet retail services debuts with week-long charity auction for the Computer Museum in Boston," May 24, 1995, printed from www.dialogweb.com/cgi/dwclient?dwconnmand-,DWEBPRINT%20810-489267.

"Onsale joins fray as online shopping picks up speed: Internet Booms," Computer Reseller News, Jun. 5, 1995.

Palm, Inc. Palm™ Web Pro Handbook, copyright 2002-2003.

Post et al., "Application of Auctions as a Pricing Mechanism for the Interchange of Electric Power," IEEE Transactions of Power Systems, Aug. 1995, pp. 1580-1584, vol. 10, No. 3.

Preist et al., "Adaptive agents in a persistent shout double auction," International Conference on Information and Computation, Proceedings of the first international conference on information and computation economies, Oct. 25-28, 1998, Charleston, United States, pp. 11-18.

Qualcomm, "Brew Developer Support," printed from web.archive.org/web/20020209194207/http:/www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

Reck, "Formally Specifying an Automated Trade Execution System," J. Systems Software, 1993, pp. 245-252, vol. 21.

Reck, "Trading-Process Characteristics of Electronic Auctions," Electronic Markets—The International Journal, Dec. 1997, pp. 17-23, vol. 7, No. 4.

repcheck.com, www.repcheck.com homepage, printed from web.archive.org/web/20020330183132/http://repcheck.com on Sep. 5, 2009.

Resnick et al., "Reputation Systems," Communications of the ACM, Dec. 2000, pp. 45-48, vol. 43, No. 12.

Rockoff et al., "Design of an Internet-based system for remote Dutch auctions," Internet Research: Electronic Networking Applications and Policy, 1995, pp. 10-16, vol. 5, No. 4.

Rose, "Vendors strive to undo Adobe lock-hold," Computer Reseller News, Feb. 5, 1996, n 66669, p. 71(7).

Rysavy, "Mobile-commerce ASPs do the legwork," Network Computing, Jan. 22, 2001, p. 71, 6 pgs., vol. 12, No. 2.

Saunders, "AdFlight to Offer WAP Ads," Oct. 17, 2000, printed from clickz.com/487531/print.

Schmid, "Electronic Markets," Electronic Markets—The International Journal, Oct. 1993, 2 pages, vol. 3, No. 3.

Schwankert, "Matsushita Taps 2Roam for Wireless Solutions," www.internetnews.com/bus-news.article.php/674811, Feb. 2, 2001.

Şen, "Inventory and Pricing Models for Perishable Products," Doctor of Philosophy Dissertation—University of Southern California, Aug. 2000.

Siegmann, "Nowhere to go but up," PC Week, Oct. 23, 1995, 3 pages, vol. 12, No. 42.

Telephony Staff, "Air-ASP," Telephone Online, Oct. 2, 2000, 3 pages.

Teo, "Organizational Factors of Success in Using EDIS: A Survey of Tradenet Participants," Electronic Markets—The International Journal, Oct. 1993, 2 pages, vol. 3, No. 3.

Tjostheim et al., "A case study of an on-line auction for the World Wide Web," printed from www.nr.no/gem/elcom/puplikasjoner/enter98e.html on Jun. 10, 1999, 10 pages.

Turban, "Auctions and Bidding on the Internet: An Assessment," Electronic Markets—The International Journal, Dec. 1997, 5 pages, vol. 7, No. 4.

ubid.com, "How do I Update my Address, Phone, Credit Card, Password, etc.?" printed from web.archive.org/web/20010208113903/www.ubid.com/help/topic13asp on Aug. 30, 2007.

ubid.com, "How do I track my shipment?" printed from web.archive.org/web/20010331032659/www.ubid.com/help/topic27.asp on Aug. 30, 2007.

ubid.com, "Can I track all of my bids from My Page?" pritned from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSWIRE, Sep. 23, 2002.

Warbelow et al., "AUCNET: TV Auction Network System," Harvard Business School 9-190-001, Jul. 19, 1989, Rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

xchanger.net, webpage printed from www.auctiva.com/showcases/as_4sale.asp?uid=exchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

(56) References Cited

OTHER PUBLICATIONS

2ROAM, Inc., multiple archived pages of www.2roam.com retrieved via Internet Archive Wayback Machine on Jun. 10, 2008.
Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 3, No. 3.
Anonymous, Image manipulation (image-editing software and image-manipulation systems)(Seybold Special Report, Part II), Seybold Report on Publishing Systems, May 15, 1995, p. S35(9), vol. 24, No. 18.
auctionwatch.com, multiple pages—including search results for "expedition," printed Apr. 21, 2011.
auctiva.com, multiple pages, undated but website copyright date is "1999-2000."
Berger et al., "Random Multiple-Access Communication and Group Testing," IEEE, 1984.
Braganza, "Is Research at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for Getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web; Number One Car Rental Company to Provide Customers Wireless Access from Any Device," Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Clarke, "Research Programme in Supra-organizational Systems," Electronic Markets—The International Journal, Oct. 1993, 2 pages, vol. 3, No. 3.
Clemons et al., "Evaluating the prospects for alternative electronic securities markets," Proceedings of the twelfth international conference on information systems, New York, New York, United States, pp. 53-64, 1991.
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
ICROSSING, "ICROSSING Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with a included. ISBN 0-7381-2601-2.
Ives et al., "Editor's Comments—MISQ Central: Creating a New Intellectual Infrastructure," MIS Quarterly, Sep. 1994, p. xxxv.
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Lee, "AUCNET: Electronic Intermediary for Used-Car Transactions," Electronic Market—The International Journal, Dec. 1997, pp. 24-28, vol. 7, No. 4.
LIVE365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers highspeed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinity, "Build Your Weapon," PC Magazine, Apr. 24, 2011, printed from www.pcmag.com/print_article2?0,1217,a%253D3955,00.asp.
Meade, "Visual 360: a performance appraisal system that's 'fun,'" HR Magazine, 44, 7, 118(3), Jul. 1999.

\* cited by examiner

SYSTEM, PROGRAM PRODUCT, AND METHODS FOR ONLINE IMAGE HANDLING

CROSS-REFERENCE TO RELATED APPLICATIONS

This application is a division of U.S. patent application Ser. No. 13/181,016, filed Jul. 12, 2011, now U.S. Pat. No. 8,452,691, which is a division of U.S. patent application Ser. No. 11/524,985, filed Sep. 21, 2006, now U.S. Pat. No. 7,979,340, which claims the benefit of U.S. Provisional Application No. 60/719,673, filed on Sep. 21, 2005, and is related to U.S. patent application Ser. No. 11/210,230, by Korth et al., titled "System, Program Product, and Methods for Online Image Handling," filed on Aug. 23, 2005, which are incorporated herein by reference in their entireties, including but not limited to those portions that specifically appear hereinafter, the incorporation by reference being made with the following exception: In the event that any portion of the above-referenced applications are inconsistent with this application, this application supercedes the above-referenced applications.

STATEMENT REGARDING FEDERALLY SPONSORED RESEARCH OR DEVELOPMENT

Not Applicable.

BACKGROUND

1. The Field of the Invention

The present invention relates in general to electronic commerce and, in particular, to systems, program product, and methods of electronic commerce through communication networks that utilize online image handling to provide users with images of products during online activities.

2. Description of Related Art

Millions of consumers each year purchase merchandise online through electronic communication (e.g., via the World Wide Web (the "Web")), making online shopping a multibillion dollar industry. Not only are consumers purchasing new items from online retailers, but consumers are also purchasing items, sometimes previously owned by others, through online marketplaces, e.g., auction sites. With online marketplaces, purchasers can often locate rare collector's items and find good deals on items that they want or need.

Purchasers are not the only ones that have benefited from online marketplaces. Sellers no longer have to resort to local newspaper ads or garage sales to sell their products, both of which take time and only allow sellers to market their products to local buyers. For a small amount of time and money, sellers can have worldwide access to potential purchasers for their items. Many people supplement their income by selling items, such as clothing and toys that their children have outgrown, through online marketplaces. For example, instead of giving the clothing and toys away, sellers can resell the items and recoup at least a portion of the original purchase price.

In some online marketplaces, when a seller decides that they want to sell a product online, the seller typically completes a product registration form and provides a digital image of the item. The registration form of an auction site, for example, typically includes information, such as contact information, product description, starting bid price, the duration of the auction, shipping details, and the like. The registration form and the digital image are uploaded to the online auction website's server, where a selling webpage is generated, or the item is added to an existing webpage, to thereby include and advertise the item that is being sold. On the selling webpage, a miniature copy of the digital image of the item is often displayed along with the item description to enable potential buyers to view the item online. If the digital picture was not a close-up picture of the item, it can be difficult to see the item in the miniature copy of the digital image.

In a typical online marketplace transaction, a potential buyer decides upon a good or service that they are interested in purchasing. The potential buyer then initiates access to an online marketplace e-commerce website via the Web, perhaps after conducting a search for the website with a commercial search engine. After the desired marketplace website is located, the potential buyer searches the marketplace website for the desired good or service, either by conducting a search of the website or by paging through the website content. The website content typically contains a title for the item and often a miniature image of the item. If the potential buyer wants to learn more about the item or see a closer view of the item, the potential buyer will click on the title and/or the miniature image to access a detailed description and larger image of the item. The larger image located on this web page is the same as the original digital image supplied by the selling user. An even larger image of the item can be accessed by clicking on the original sized digital image.

In the auction example, if the potential buyer wants to make a bid to attempt to successfully purchase the item, the potential buyer can make a bid for the item. If at the time of the end of auction, the potential buyer has the highest bid, then the potential buyer will be able to purchase the item from the selling user. Once the payment has been submitted to the selling user, the selling user usually is responsible for shipping the item to the buyer in accordance with the shipping instructions that were listed with the detailed description of the item.

Although most current marketplace websites have some usefulness, their shortcomings collectively represent impediments to the conduct of e-commerce, which are addressed and overcome by the present invention.

SUMMARY OF THE INVENTION

In view of the foregoing, embodiments of the present invention advantageously provide enhanced methods, program products, and systems of facilitating electronic commerce between a selling user computer and a potential buyer computer over a network. For example, embodiments of systems, program products, and methods of the present invention advantageously can enhance the quality of images provided in e-commerce type of transactions and can enhance transaction presentation or launch speeds in some types of e-commerce transactions. Also, embodiments of systems, program products, and methods can enhance images to be displayed to potential buyers.

Embodiments of the present invention include a system to facilitate e-commerce associated with an online marketplace between a plurality of selling users and a plurality of potential buyers over a computer network. For example, an embodiment of a system can include a host computer accessible to the computer network to host the online marketplace, e.g., online auction website, to thereby define a marketplace (e.g., auction site) administrator server. The marketplace administrator server can include memory coupled to a processor to store operating instructions therein and an online-commerce program product. The system can also include a marketplace administrator server database accessible to the processor of the marketplace administrator server and having database records related to a plurality of marketplace items to be sold by the plurality of selling users, and a marketplace administrator image file server accessible to the processor of the marketplace administrator server and having image files related to the plurality of marketplace items to be sold by the plurality of selling users.

The system can also include a second computer positioned remote from the marketplace administrator server and each of the selling users and accessible to the computer network to provide seller marketplace management services to the plurality of selling users to thereby define a seller marketplace management server. The seller marketplace management server has a processor and memory coupled to the processor to store operating instructions therein. The seller marketplace management server can provide tools to design custom sale item postings, consolidate postings to be used on multiple online marketplaces, and can provide data delivery services for various items to be sold/advertised. As such, a seller marketplace item management server database accessible to the processor of the seller marketplace item management server is provided to receive and store, at least temporarily, database records related to the plurality of marketplace items to be sold by the plurality of selling users. A marketplace administrator image file server accessible to the processor of the marketplace administrator server is also provided to receive and store image files related to the plurality of marketplace items to be sold by the plurality of selling users.

The system can also include a plurality of selling user computers most of which can be positioned separately at a corresponding plurality of selling user sites remote from both the seller marketplace item management server and the marketplace administrator server but accessible to the computer network. Each selling user computer can have a processor and memory coupled to the processor to store operating instructions therein and to send data related to items for sale, e.g., via auction or direct sales, to the seller marketplace item management server, and a display in communication with the processor to graphically display auction items or other forms of items for sale using an associated selling user web browser stored in the memory. The system correspondingly can also include a plurality of potential buyer computers most of which also can be positioned separately at a corresponding plurality of potential buyer user sites remote from both the seller marketplace item management server and the marketplace administrator server but also accessible to the computer network. Each potential buyer computer can have a processor and memory coupled to the processor to store operating instructions therein and to receive data related to items for sale, and a display in communication with the processor to graphically display seller marketplace item web pages accessed through the computer network using an associated potential buyer web browser stored in the memory.

The system can also include seller marketplace item management program product stored in the memory of the seller marketplace management server to facilitate seller marketplace item management between the plurality of selling users and the online marketplace.

The seller marketplace item management program product can include instructions that, when executed by the seller marketplace management server, cause the seller marketplace management server to perform the operations of presenting an marketplace-item-creation form for selling or presenting a marketplace item, either through direct sales or through auction sales, to a selling user web browser over a computer or other communication network. The selling user, preferably previously registered with one or more online marketplaces, accesses the marketplace-item-creation form through the seller marketplace item management server, to thereby provide data to form a custom seller marketplace item web page displaying the marketplace item or items. That is, the selling user can enter data in the marketplace-item-creation form to develop the web page to thereby provide item information to describe the various attributes of for one or more associated marketplace items. For example, the marketplace-item-creation form can include fields such as: a main category and/or subcategories of the item; a title and/or subtitle of the item; a physical location of the item, if applicable; pricing information; the item description; user selectable visual enhancements, i.e., highlighting; payment requirements; and shipping requirements and limitations, just to name a few.

During form completion, the selling user can select or otherwise upload one or more original item image files displaying an item image of the marketplace item or items. This original item image file can be identified by file location within a selling user computer associated storage device or uniform resource locator. Upon completion and as part of submittal of each marketplace-item-creation form, data related to a respective one of a plurality of marketplace items defining database record data that was entered by each respective selling user is sent or otherwise transmitted from each associated one of the plurality of selling user computers. The database record data is received by the seller marketplace item management server and stored in the seller marketplace item management server database to define a corresponding plurality of database records. The data can indicate immediate posting or can provide a scheduled posting time. According to the selling user posting time selection, the seller marketplace item management program product instructions can include those to perform the operation of queuing each of the plurality of database records for sending to the marketplace administrator server, and sending each of the plurality of database records to the marketplace administrator server in response to each respective scheduled item posting time. According to an embodiment of the present invention, the original item image files each associated with one of the database records can be sent along with the associated database record. According to another embodiment of the present invention, a location of the original item image file or files such as, for example, a respective uniform resource locator, can instead be provided within each associated database record.

The system can further include online e-commerce program product stored in the memory of the marketplace administrator server. The online e-commerce program product can include instructions that, when executed by the marketplace administrator server, cause the marketplace administrator server to selectively perform various operations including receiving each of the plurality of database records from the seller marketplace item management server over the network, storing each of the plurality of database records in the marketplace administrator server database, and receiving or retrieving over the network the original item image file for each of the plurality of marketplace items. The online e-commerce program product includes instructions to perform the operations of randomly generating or otherwise forming a set of at least two or more scaled item image files, and discarding the original image file. The image files can be randomly generated within respective preselected viewable image size ranges and can provide image size variations of the item image of each respective marketplace item to thereby represent each respective marketplace item. The set of at least two item image files can include a first item image file providing a first image sized randomly based on a first preselected size range and a second item image file providing a second image sized randomly based on a second preselected size range with the second image being substantially larger than the first image.

The online e-commerce program product also can include instructions to perform the operations of assigning each of the first and the second item image files a unique name, storing each set of first and second image files in the marketplace administrator image file server, and creating and presenting to a potential buyer the seller marketplace item web page. That is, the instructions to perform the operation of presenting the seller marketplace item web page, for example, can include those to perform the operations of accessing one of the plurality of database records in response to a received item identification number for a selected marketplace item, to thereby determine an item title and description of the selected marketplace item and the item image file name for each of the first and the second item images of the selected marketplace item. The instructions can also include those to perform the operations of determining a location of the first image associated with the selected marketplace item and a location of the second image associated with the selected marketplace item using the look-up table organized by image name in response to the accessing, and adding the image file location for the first and the second item image and associated title and description of the selected marketplace item to an associated seller marketplace item web page, to allow retrieval of the item images by the potential buyer computer and display of the seller marketplace item web page. Note, each seller marketplace item web page can originate as a template whereby the specific item information and item images (image locations) can be added to the template to thereby "create" each individual seller marketplace item web page.

In an embodiment of the present invention, in order to minimize the size of the seller marketplace item web page and allow for display of multiple views of the same marketplace item and/or multiple related marketplace items, the seller marketplace item web page can provide a single large second item image viewing location in, e.g., an item description section of the seller marketplace item web page, to display each large second item image provided by the selling user to represent the marketplace item or items. The seller marketplace item web page can further provide a separate item image location for each associated small first item image. That is, the seller marketplace item web page can display each small first item image which can, for example, function to allow the potential buyer to select and view the associated large second item image of each view represented by the selling user selected small first item images, respectively. Also, one or more of the first or second item images can be presented in different sizes and different locations within the seller marketplace item web page as scaled by the browser of the potential buyer computer. Further, in order to standardize the layout of the various seller marketplace item web pages among different selling users, according to the preferred embodiment of the present invention, an item information section can be provided that includes a standardized item image of the first uploaded item in the form of either the respective large or small image, but adjusted to a standard size such as, for example, 150 pixels by 150 pixels.

In another embodiment of the present invention, a system to facilitate electronic commerce associated with an online marketplace between a selling user computer and a potential buyer computer over a computer network is advantageously provided. In this embodiment, the system preferably includes an Internet marketplace website server or marketplace administrator server that can include a processor and memory (or storage) in communication with or coupled to the processor, to store operating instructions therein, and can include a database that is accessible to the processor and contains database records about items to be sold by the selling users. The database can be directly associated with the server, that of a third party image service provider, or a combination thereof.

The system includes a selling user computer positioned at a selling user site accessible to the computer network. The selling user computer can have a processor, memory, a graphical display, and a user interface each coupled to the processor. The memory which can include both volatile and non-volatile forms, is used to store software or operating instructions therein. The graphical display is used to display images for viewing by the selling user. The user interface provides the selling user with access to manipulate the stored software or operating instructions on the selling user computer including those for sending to the server data about an item.

The system also includes a potential buyer computer positioned at a potential buyer user site accessible to the computer network. The potential buyer computer has a processor and memory, a graphical display, and a user interface all coupled to the processor. The memory is used to store software or operating instructions therein and to receive images and database records from the server. The graphical display is used to display images for the potential buyer. The user interface provides the potential buyer user with access to manipulate the software or operating instructions and received database records.

The system can further include online e-commerce program product stored in the memory of the marketplace administrator server to facilitate electronic commerce over the computer network between the plurality of selling users and the plurality of potential buyers. The online e-commerce program product includes a set of instructions that, when executed by the marketplace administrator server, cause the marketplace administrator server to perform the operations of receiving over the network a plurality of original image files each related to a separate one of a plurality of marketplace items and each providing an item image of the respective one of the plurality of marketplace items, and forming from each of the original item image files a set of at least two item image files to provide image size variations of each respective item image of each of the plurality of marketplace items. According to an embodiment of the present invention, the at least two item image files includes a first item image file providing a first image sized randomly based on a first preselected size range and a second item image file providing a second image sized randomly based on a second preselected size range, the second item image substantially larger than the first item image.

Embodiments of the present invention also include a computer memory element containing, stored in signal bearing media, a database containing data in computer readable format. Advantageously, such data can indicate a community of electronically interconnected users of a publicly accessible computer network, along with various auction item/item for sale attributes such as, for example, a description of the item including a location and/or name of at least two scaled images of the item generated from an original graphical image of the item supplied by a selling user and randomly sized within a respective predetermined size range.

Embodiments of the present invention include methods of facilitating e-commerce associated with an online marketplace between a plurality of selling users and a plurality of potential buyers over a computer network. For example, in an embodiment of a method of facilitating e-commerce, a marketplace-item-creation form for selling a first item is presented to a selling user web browser over a computer network. A selling user accesses the marketplace-item-creation form through a seller marketplace item management server, to thereby create a seller marketplace item web page. The selling user begins entering data in the marketplace-item-creation form to develop the seller marketplace item web page to thereby provide information for one or more associated items to be sold or otherwise for sale. The data can include a time and a duration scheduled by the selling user for displaying the marketplace item or items on the seller marketplace item web page. During form completion, the selling user selects or otherwise uploads an original item image file or file location displaying an item image of an item for sale. This original item image file can be identified by file location within a selling user computer associated storage device or uniform resource locator.

The method includes sending to the seller marketplace item management server the data related to the marketplace item or item entered in the marketplace-item-creation form for on-demand retrieval. The data can include a title and a description of the marketplace item or items and a location of an original item image file of each marketplace item, which includes an item image of the respective marketplace item. The method also includes sending a database record related to the marketplace item by the seller marketplace item management server over the computer network to a marketplace administrator server, storing the database record related to the marketplace item in a marketplace administrator server database for use on the online marketplace, and receiving the original item image file of the marketplace item through the computer network. The method also includes forming a set of at least two item image files from the original item image file to provide image size variations of the item image to represent the marketplace item. The set of the at least two item image files including a first item image file providing a first image and a second item image file providing a second image sized substantially larger than the first image. The at least two item image files are then stored in a marketplace administrator image file server for use on the online marketplace and discarding the original image file or files to conserve memory and reduce storage requirements. The at least two item image files can advantageously provide categorical image size variations of the item image of each marketplace item. When used in a seller marketplace item web page, one of the item images, when selected by a potential buyer utilizing an input device for a potential buyer computer, can function as an icon selectable to send commands to the potential buyer computer and/or remote marketplace administrator server to display another one of the at least two image files, to thereby display to the potential buyer an enlarged image of the marketplace item or items.

According to an embodiment of the present invention, a method of facilitating electronic commerce associated with an online marketplace between a selling user computer and a potential buyer computer over a computer network can include the steps of receiving an original item image file of a marketplace item through a computer network, forming a set of at least two item image files from the original item image file to provide image size variations of the item image to represent the marketplace item, and storing the first and the second item image files for use on the online marketplace. The set of at least two item image files can include a first item image file providing a first image and a second item image file providing a second image sized substantially larger than the first image. The first item image can be randomly sized based on a first preselected size range and the second image can be randomly sized based on a second preselected size range, which can be substantially larger than the first.

Advantageously, embodiments of the methods and systems of the present invention, can, for example, be used with online auction web sites, as well as direct and catalog sales websites, or a combination thereof. The selling users and the potential buyers can be individuals or companies. Embodiments of the methods and systems of the present invention also can be used in person-to-person, person-to-business, business-to-business, and business-to-person electronic commerce transactions.

Embodiments of the present invention also include a computer readable medium that is readable by a computer to facilitate electronic commerce between a plurality of selling users (selling user computers) and a plurality of potential buyers (potential buyer computers) in a computer network. For example, a computer readable medium can include a set of instructions that, when executed by a computer, such as, for example, a marketplace administrator server, cause the computer to perform the operations of receiving a plurality of database records related to a corresponding plurality of marketplace items over the computer network from a seller marketplace item management server, receiving through the computer network a separate original item image file for each of the plurality of marketplace items, and forming a set of at least two item image files from each of the original item image files to provide image size variations of each respective item image to thereby represent each respective marketplace item. Each set of at least two item image files can include a first item image file providing a first image sized randomly based on a first preselected size range and a second item image file providing a second image substantially larger than the first image and sized randomly based on a second preselected size range. The instructions can also include those to perform the operation of storing the first and the second item image files in a marketplace administrator image file server for on-demand retrieval and display through an online marketplace, and adding to a seller marketplace item web page an image file location for each of the first and the second item images of at least one of the sets of at least two item image files.

According to another embodiment of the present invention, a computer readable medium can include a set of instructions that, when executed by a computer, cause the computer to perform the operations of receiving an original item image file of a marketplace item through a computer network, forming a set of at least two item image files from the original item image file to provide image size variations of an item image of the marketplace item to thereby represent the item for sale, and storing the first and the second item image files for use on an e-commerce website. The set of at least two item image files can include a first item image file providing a first image and a second item image file providing a second image sized substantially larger than the first image.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

As illustrated in FIGS. 1-22, embodiments of the present invention advantageously provide a system, computer memory element, program product, and methods of facilitating e-commerce between a plurality of selling users and a plurality of potential buyers over a communication or computer network. As known to those skilled in the art, this e-commerce can include, but is not limited to, online auctions, online retail or wholesale distributors, and individual companies providing items or services for sale online, and other such online marketplaces.

Figure 1:
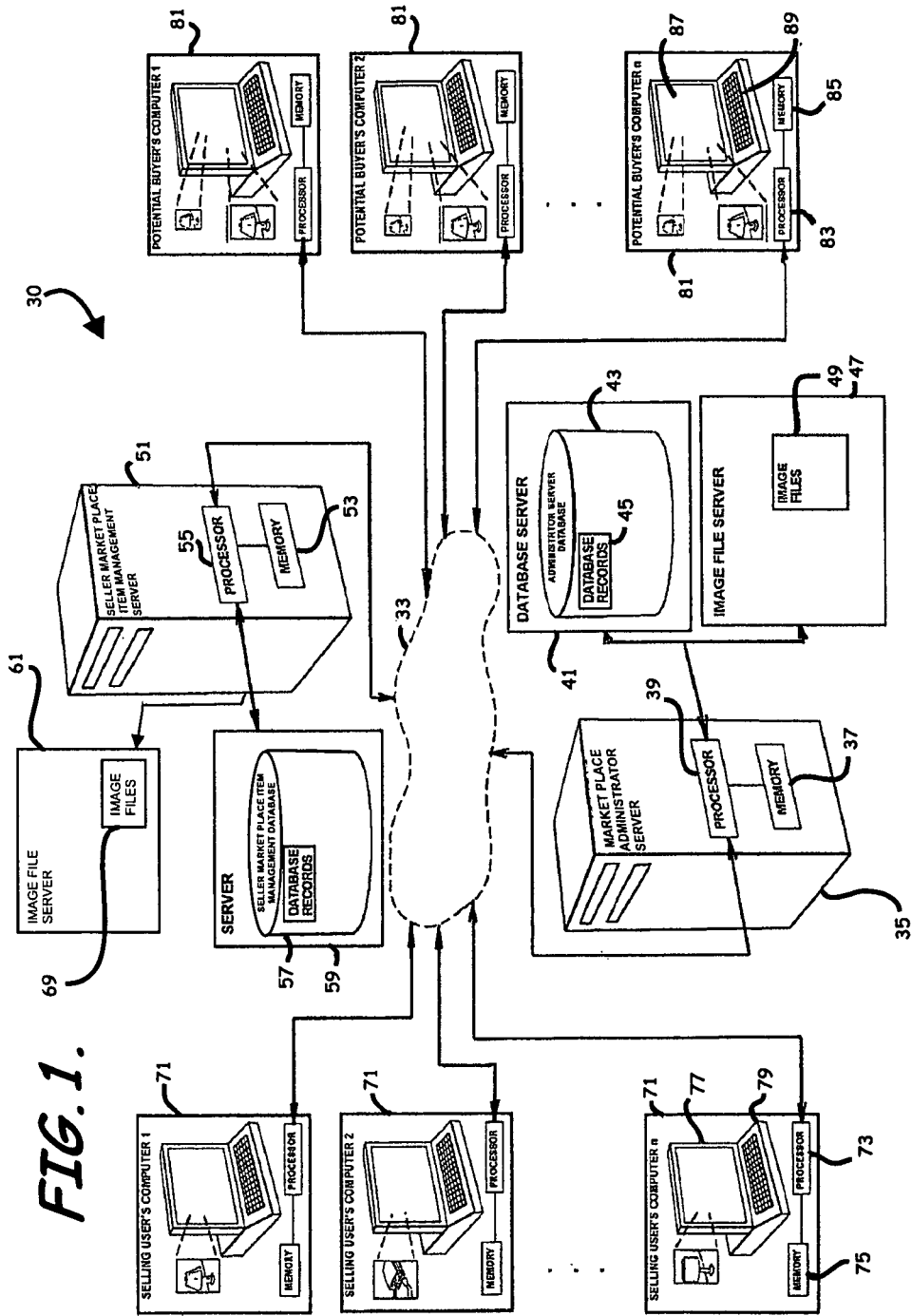
FIG. 1 is a schematic block diagram of a system to facilitate electronic commerce associated with an online marketplace between a plurality of selling users and a plurality of potential buyers over a computer network according to an embodiment of the present invention.

For example, as perhaps best shown in FIG. 1, a system 30 according to an embodiment of the present invention is provided to facilitate e-commerce through an online marketplace, e.g. online auction or product sale website, between a plurality of selling users and a plurality of potential buyers over a computer network. The system 30 includes a first computer accessible to the computer network 33 to host the online marketplace to thereby define a marketplace administrator server 35. The marketplace administrator server 35 has memory 37 coupled to a processor 39 to store operating instructions therein. The system 30 can also include a marketplace administrator server database 43 accessible to the processor 39 of the marketplace administrator server 35 and associated with for example, a marketplace administrator server database server 41. The database 43 can include database records 45 related to a plurality of items to be sold by the plurality of selling users along with attribute (registration) data related to each of the selling users. The database records 45 can include for each item, an item title, item description, item sale or minimum and/or maximum price, associated item image names and/or locations, along with other ancillary data such as shipping, insurance, or tax information and/or instructions. The system 30 can also include a marketplace administrator image file server 47 accessible to the processor 39 of the marketplace administrator server 35 and having image files 49 related to the items to be sold by the selling users.

The system 30 includes a second computer positioned remote from the marketplace administrator server 35 and each of the plurality of selling users and accessible to the computer network 33 to provide seller marketplace management services to the plurality of selling users to thereby define a seller marketplace item management server 51. The seller marketplace item management server 51 includes a processor 55 and memory 53 coupled to the processor 55 to store operating instructions therein. The seller marketplace item management server 51 provides various management services for multiple online marketplaces including eBay, Overstock.com, Amazon.com, Yahoo!, Shopping.com, Smarter, MSN, BizRate, Cnet, Froogle, Pricegrabber.com, and others. Some of those features provided to selling users can include tools to design a custom auction or sale item posting using standard layouts and theme selections, editing multiple ads, copying previous ads to use as templates, linking ads to specific inventory items, and deleting ads referencing sold out items. The various selling user services can also include those for reviewing, editing, and/or deleting scheduled auctions or other postings, viewing a consolidated listing of open auctions or other postings, viewing each postings hourly traffic, adding "HTML" to the open postings, viewing a consolidated listing of closed postings, viewing closed auctions or other posting traffic to compare traffic from multiple online marketplaces, and automatically reposting unsold items. The various selling user services can further include those to perform inventory restocking, correct errors in an ad without recreating the entire listing, automated post-transaction communications services including invoice management, exporting invoices to accounting software, invoice consolidation for buyer of multiple items, invoice cancellation, and seller shipping label creation.

The system 30 can also include a seller marketplace item management server database 57 accessible to the processor 55 of the seller marketplace item management server 51 and associated with for example, a seller marketplace item management server database server 59. The database 57 can include database records related to the plurality of items to be sold by the plurality of selling users which can be provided in whole, or in part, to the marketplace administrator server 35, described later. The system 30 can also include a seller marketplace item management image file server 61 accessible to the processor 55 of the seller marketplace item management server 51 and having image files 69 related to the items to be sold by the selling users.

Note, the memory 37 and 53 can include volatile and nonvolatile memory known to those skilled in the art including, for example, RAM, ROM, and magnetic or optical disks, just to name a few. Note, it should also be understood that the preferred server configurations are given by way of example and that other types of servers or computers configured according to various other methodologies known to those skilled in the art can be used. The servers 35, 51 shown schematically in, for example, FIG. 1 each represent a server or server cluster or server farm and is not limited to any individual physical server. The server sites may be deployed as a server farm or server cluster managed by a serving hosting provider. The number of servers and their architecture and configuration may be increased based on usage, demand and capacity requirements for the system 30.

The system 30 also includes a plurality of selling user computers 71. Each selling user computer 71 can be positioned at one or more selling user sites remote from the marketplace administrator server 35, accessible to the computer network 33, and can have a processor 73 and memory 75 coupled to the processor 73 to store operating instructions therein and to send data related to an item to the marketplace administrator server 35. Each selling user computer 71 can also include a display 77 in communication with the processor 73 to display items using an associated selling user web browser stored in the memory 75 and a user interface 79 coupled to the processor 73 to provide the selling user with access to manipulate functions within the selling user web browser. Advantageously, this configuration allows each selling user to view and/or edit selling user registration data and to view and/or edit marketplace item/sale item attributes, upload related images, and manage the promotion and delivery of such items.

The system 30 can also include a plurality of potential buyer computers 81. Each potential buyer computer 81 can be positioned at a separate potential buyer user site remote from the marketplace administrator server 35, accessible to the computer network 33, and a processor 83 and memory 85 coupled to the processor to store operating instructions therein and to receive database records. Each potential buyer computer 81 also can include a display 87 in communication with the processor 83 to display seller marketplace web pages accessed through the computer network 33 using an associated potential buyer web browser stored in the memory 85 and a user interface 89 coupled to the processor 83 to provide the potential buyer with access to manipulate functions within the potential buyer web browser. Advantageously, this configuration allows the potential buyer to search for and to access a plurality of seller marketplace item web pages (see, e.g., FIG. 2) through the computer network 33 to thereby view marketplace items and to bid on or purchase such items.

Note, although illustrated as a keyboard, the input devices 79, 89, can include other forms of device known to those skilled in the art such as, for example, a light pen, magnetic or optical card reader, trackball, touch screen, touchpad, or mouse. Further, the selling user computers 71 and potential buyer computers 81 each can take various forms known to those skilled in the art such as, for example, a desktop personal computer, portable computer, a PDA, a mobile telephone, and still other devices for accessing the Internet, that are adapted to interface with the computer network 33 while positioned remote from the marketplace administrator server 35.

Figure 2:
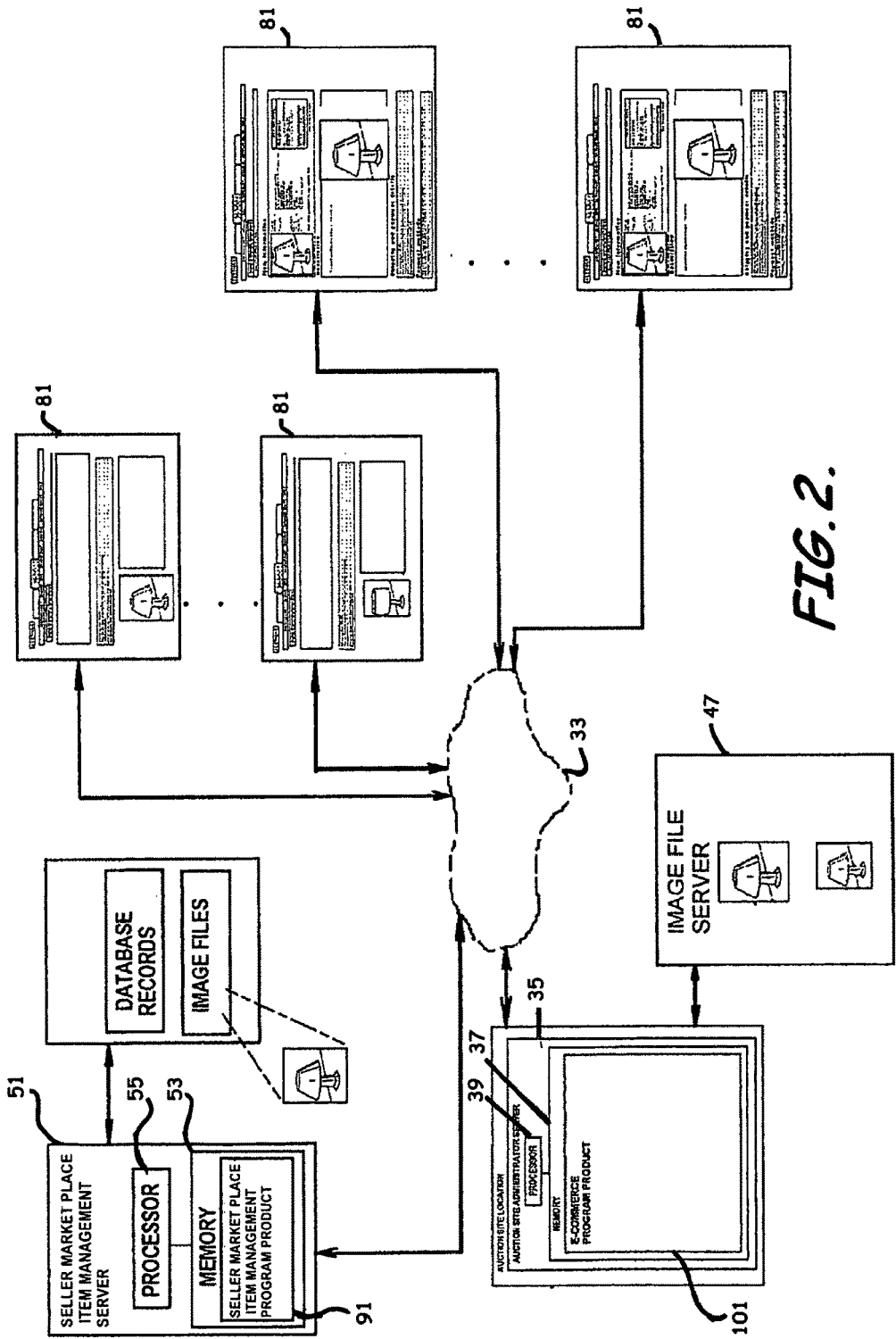
FIG. 2 is a schematic block diagram of a system to facilitate electronic commerce associated with an online marketplace between a plurality of selling users and a plurality of potential buyers over a computer network according to an embodiment of the present invention.

As shown in FIG. 2, the system 30 also includes seller marketplace item management program product 91 stored, for example, in the memory 53 of the seller marketplace item management server 51 to facilitate seller marketplace item management between the plurality of selling users and the online marketplace. The seller marketplace item management program product 91 includes functionality to allow multiple selling users to initialize a new marketplace items, enter related data, edit the data, uploading item images, select system provided item images, and/or review such data and images prior to posting.

As shown in FIGS. 3-5 and 7, the seller marketplace item management program product 91 can include instructions that, when executed by the seller marketplace item management server 51, cause the seller marketplace item management server 51 to perform various operations including providing data in the form of a web page including instructions to a seller user web browser for the browser to display a marketplace-item-creation form (not shown). The selling user, registered with one or more online marketplaces, accesses the marketplace-item-creation form through the seller marketplace item management server 51, to thereby provide data to create a seller marketplace item web page displaying the marketplace item or items. That is, the selling user can enter data in the marketplace-item-creation form to develop the web page to thereby provide item information to describe the various attributes of one or more associated marketplace items. The marketplace-item-creation form can include fields such as: a main category and/or subcategories of the item; a title and/or subtitle of the item; a physical location of the item, if applicable; pricing information; the item description; user selectable visual enhancements, i.e., highlighting; payment requirements; and shipping requirements and limitations, just to name a few.

Figure 3:
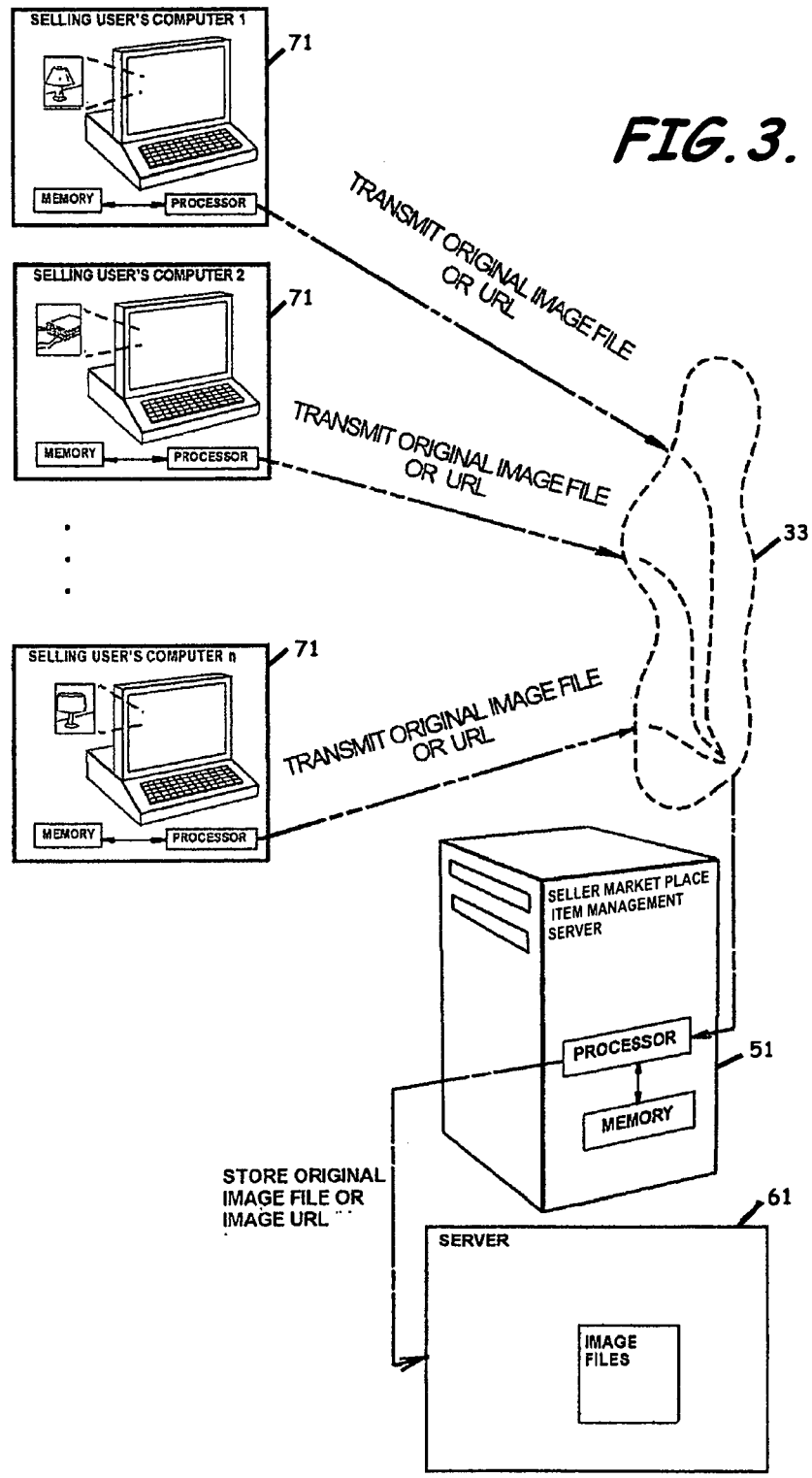
FIG. 3 is a schematic block diagram of a portion of a system to facilitate electronic commerce illustrating upload of an original image files over a computer network according to an embodiment of the present invention.
Figure 4:
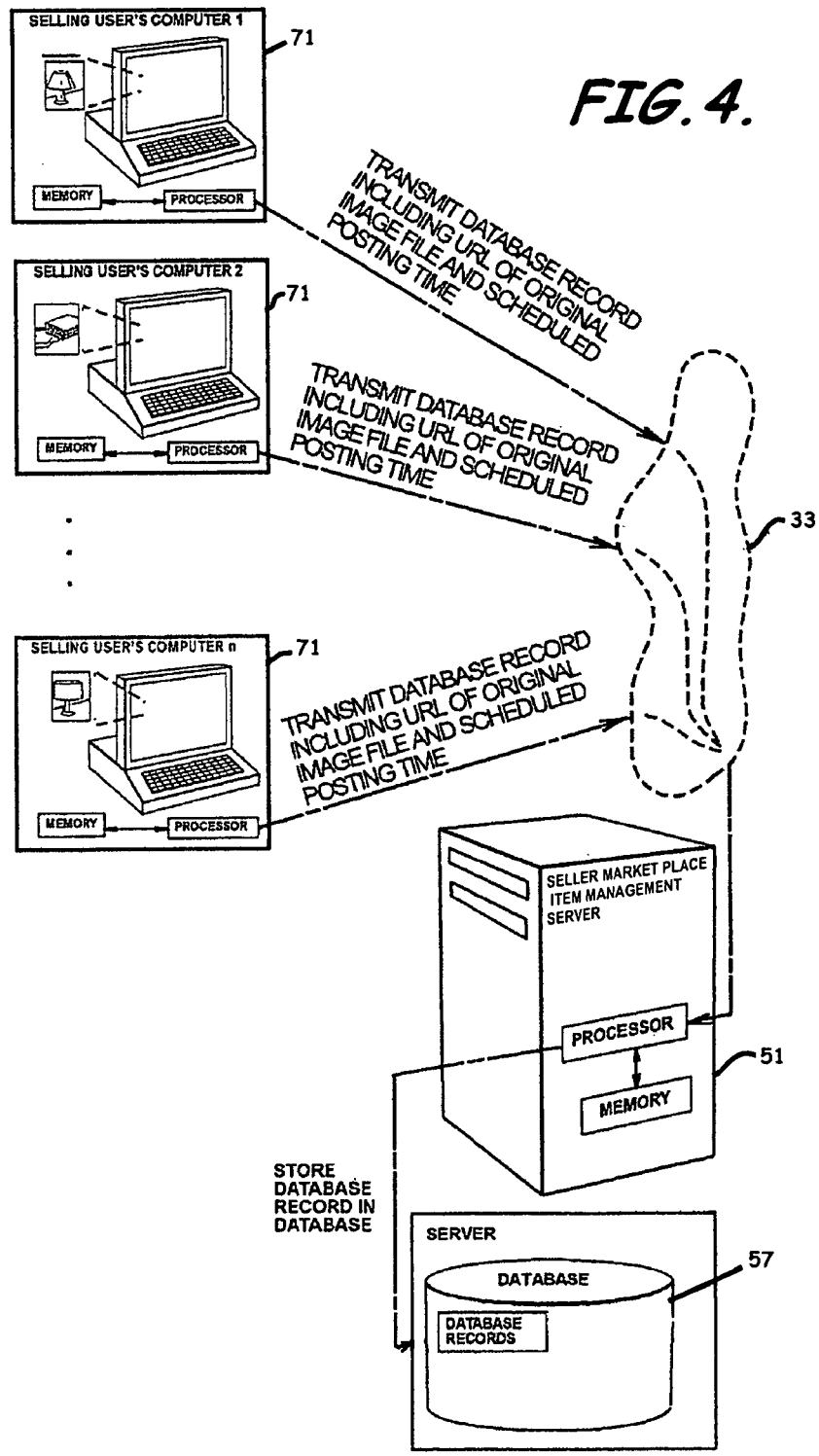
FIG. 4 is a schematic block diagram of a portion of a system to facilitate electronic commerce illustrating upload of data records over a computer network according to an embodiment of the present invention.

During form completion, the selling user can select or otherwise upload one or more original item image files displaying an item image of the marketplace item or items (see FIG. 3). This original item image file can be identified by file location within a selling user computer associated storage device or uniform resource locator. Specifically, according to an embodiment of the present invention, the marketplace-item-creation form can also include a text box to enter an image location. For sellers not having their images accessible over the Internet, the marketplace-item-creation form can also include a selection button to upload images directly to the seller marketplace item management server 51. In such case, upon selecting the file location of the original image, the selling user web browser causes the original image to be sent and the seller marketplace item management server 51 receives and stores the original item image, for example, in the seller marketplace item management image file server 61. The seller may then enter or initiate entry of the seller marketplace item management server stored image URL in the text box.

Figure 5:
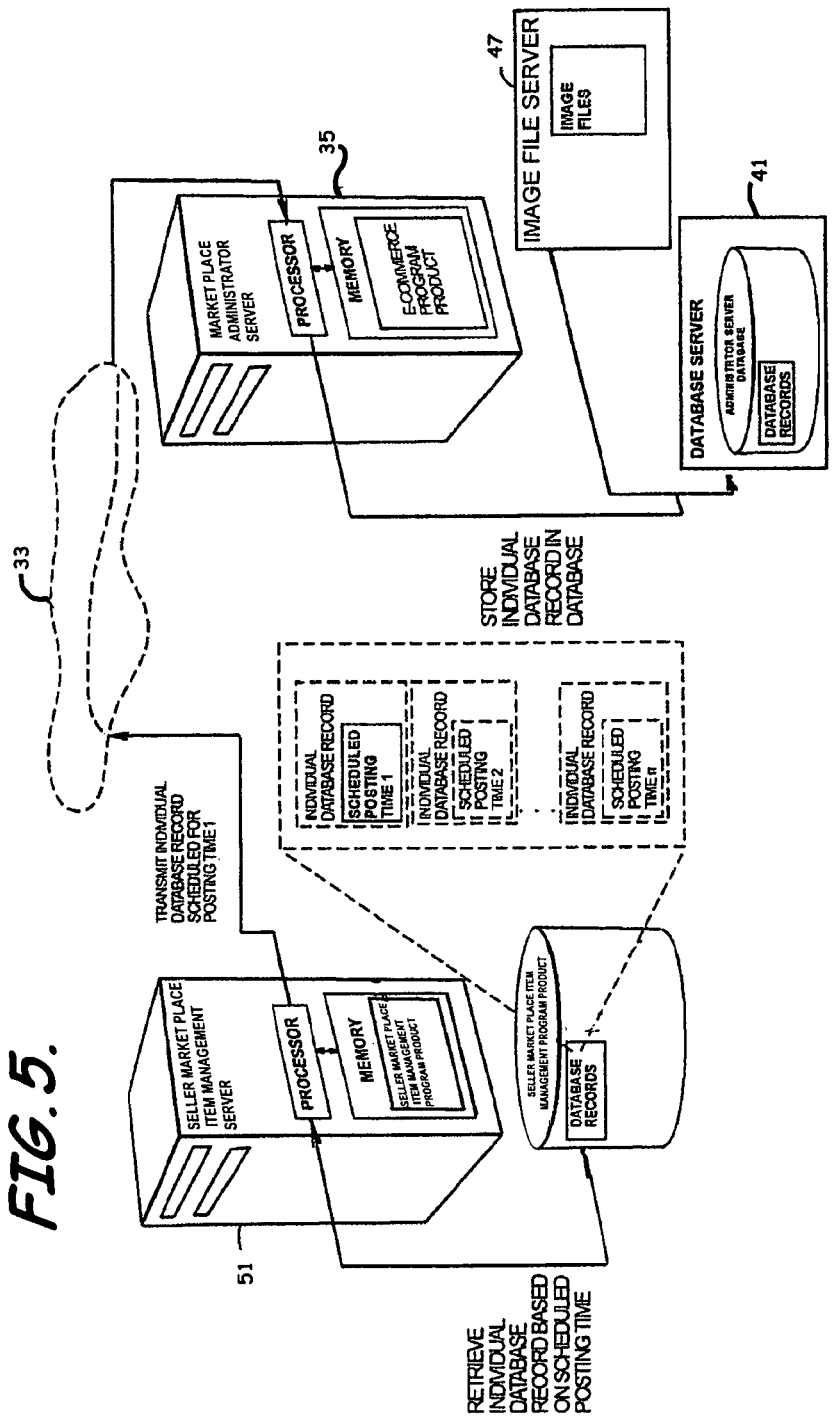
FIG. 5 is a schematic block diagram of a portion of a system to facilitate electronic commerce illustrating transmission of data records over a computer network according to an embodiment of the present invention.
Figure 6:
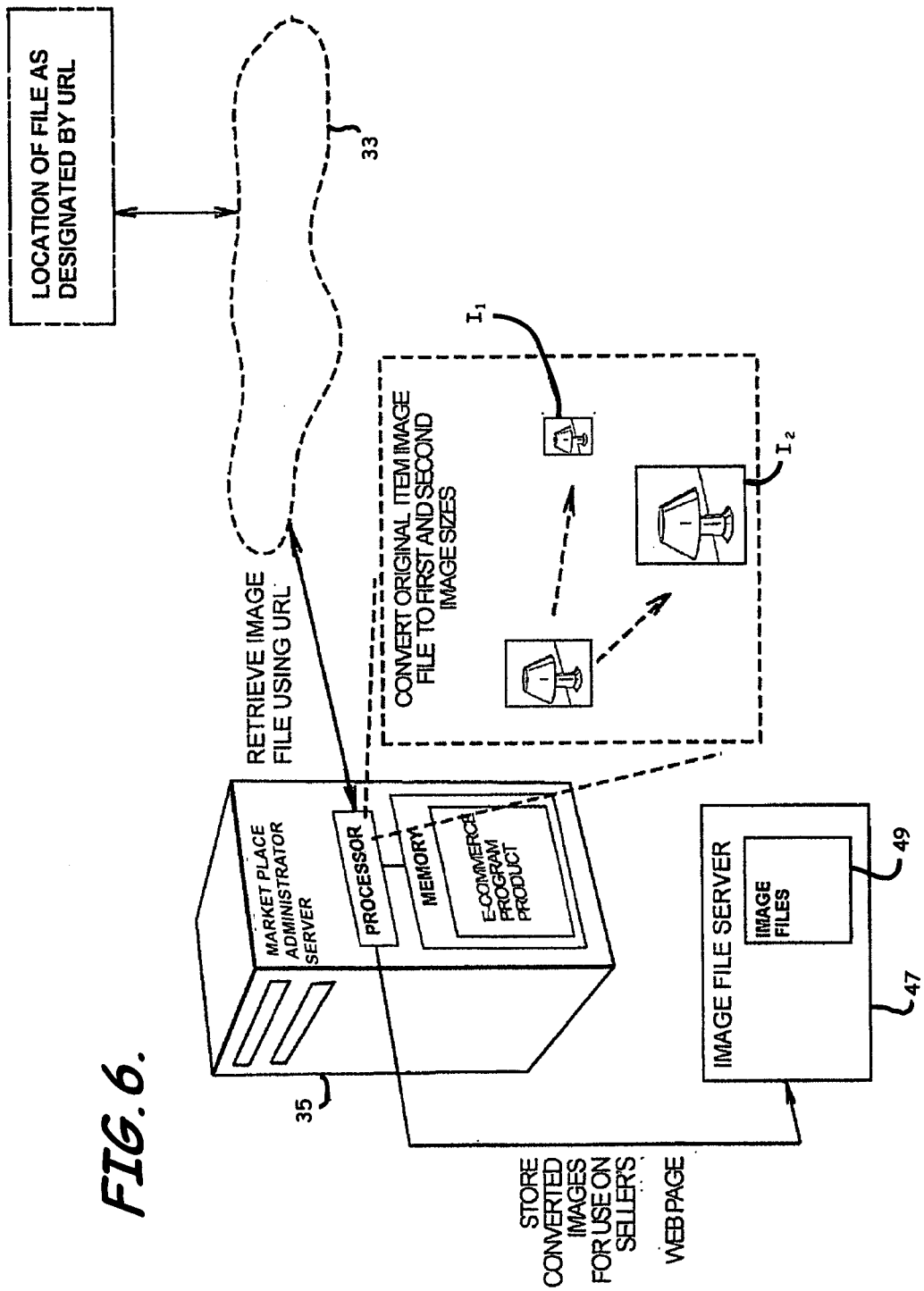
FIG. 6 is a schematic block diagram of a portion of a system to facilitate electronic commerce illustrating formation of at least two scaled image files from an original image file according to an embodiment of the present invention.
Figure 7:
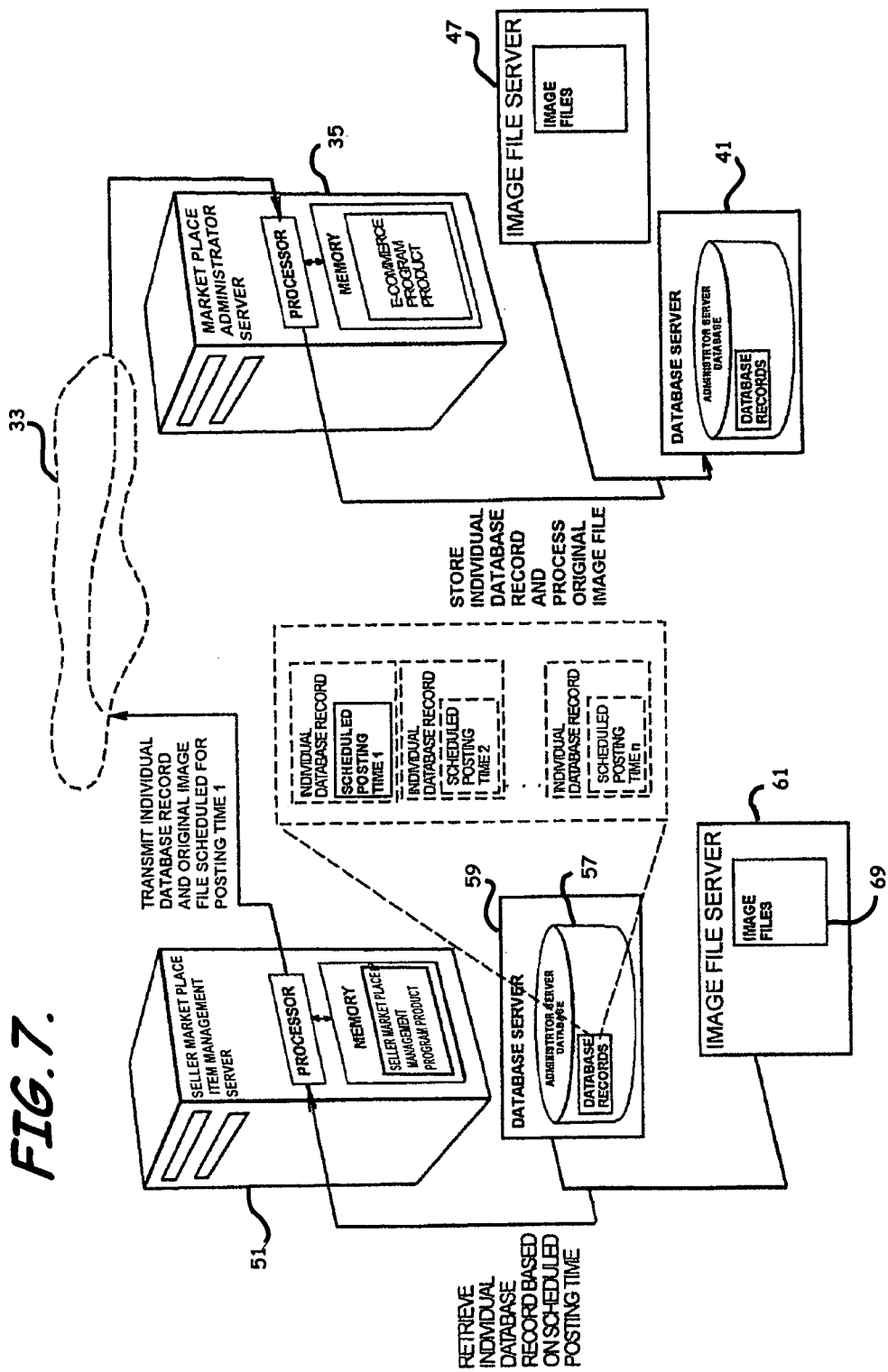
FIG. 7 is a schematic block diagram of a portion of a system to facilitate electronic commerce illustrating transmission of data records over a computer network according to an embodiment of the present invention.
Figure 8:
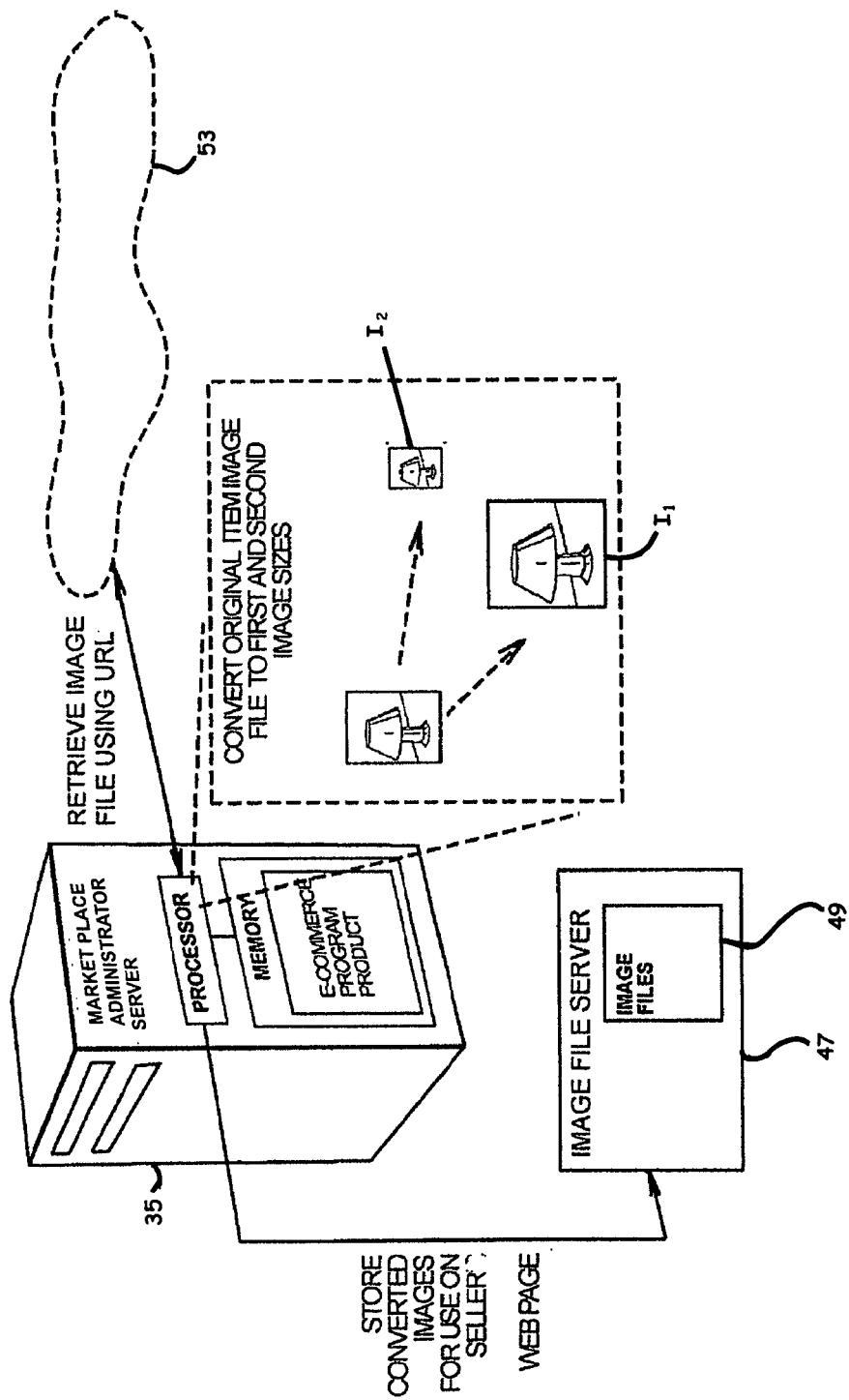
FIG. 8 is a schematic block diagram of a portion of a system to facilitate electronic commerce illustrating formation of at least two scaled image files from an original image file according to an embodiment of the present invention.
Figure 9:
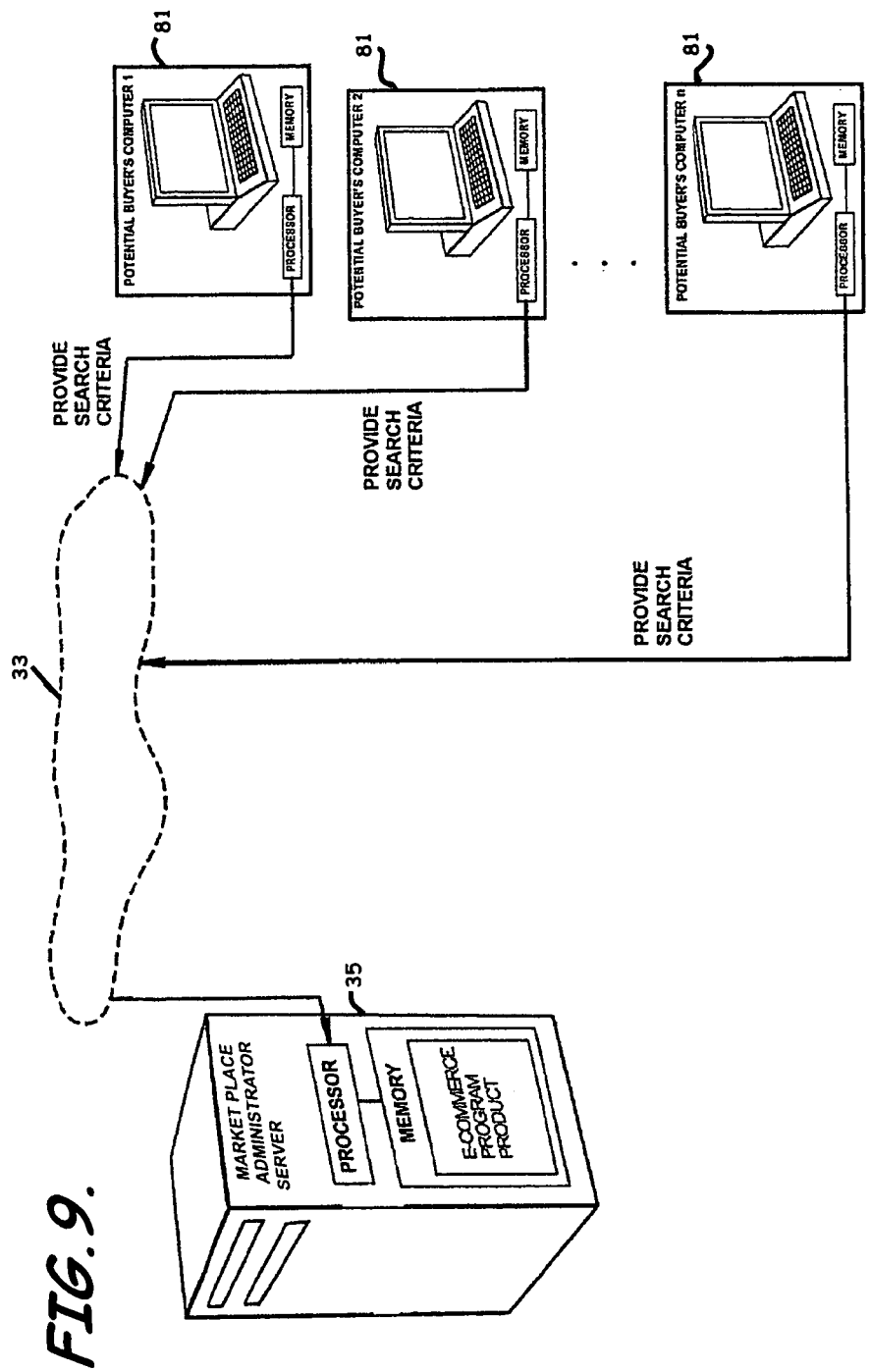
FIG. 9 is a schematic block diagram of a portion of a system to facilitate electronic commerce illustrating receiving search criteria for a plurality of items according to an embodiment of the present invention.
Figure 10:
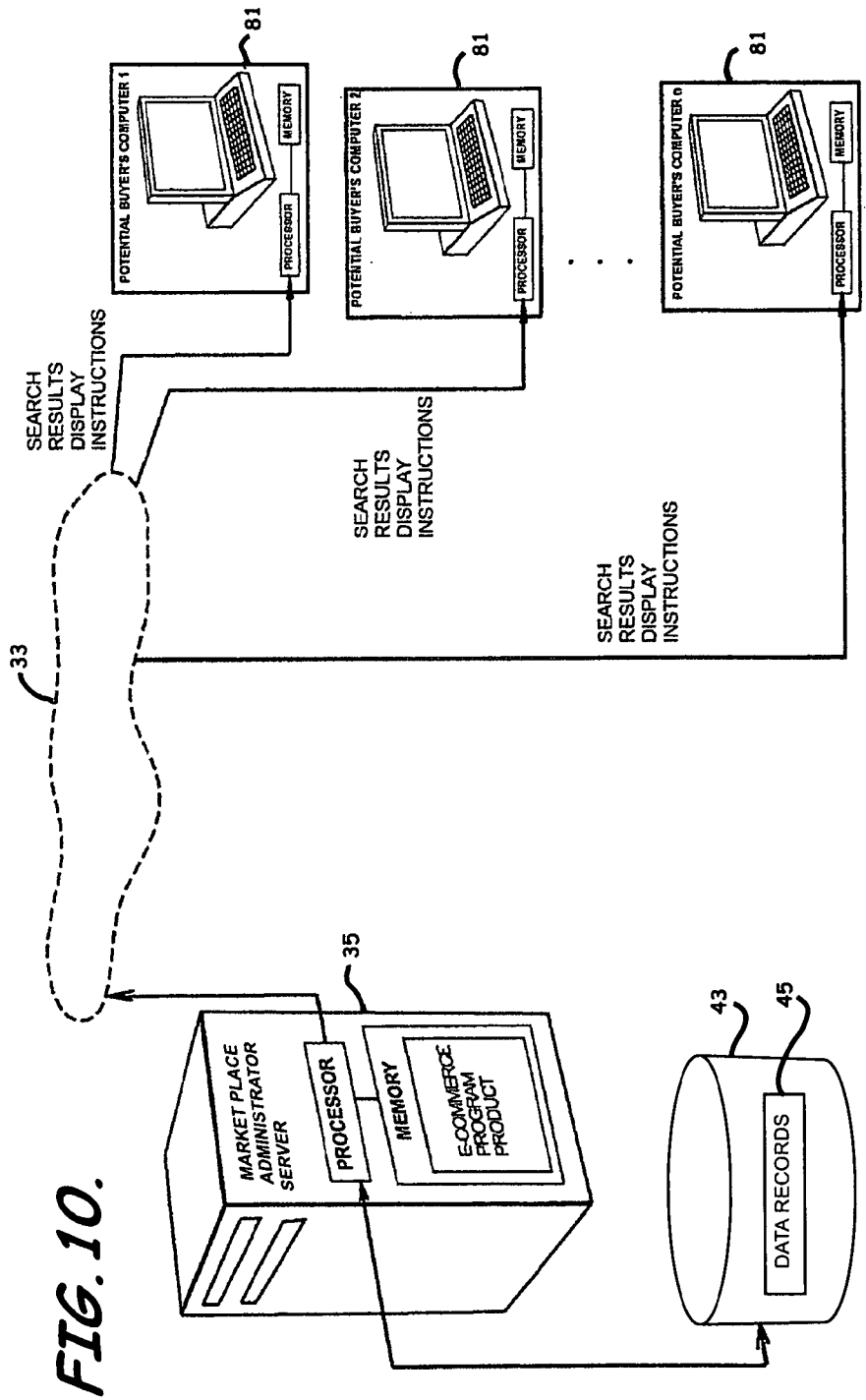
FIG. 10 is a schematic block diagram of a portion of a system to facilitate electronic commerce illustrating providing search results satisfying search criteria for a plurality of items according to an embodiment of the present invention.
Figure 11:
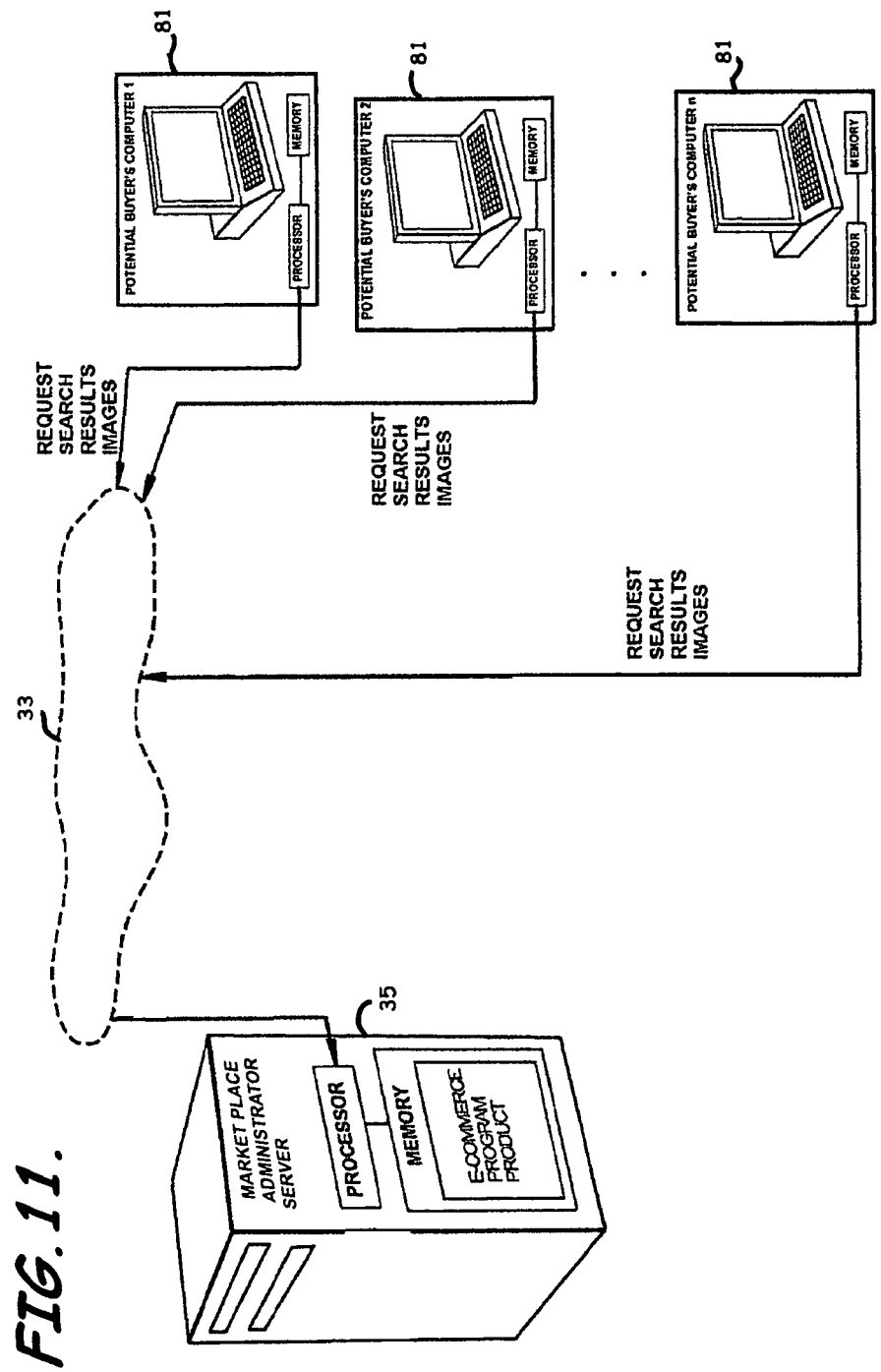
FIG. 11 is a schematic block diagram of a portion of a system to facilitate electronic commerce illustrating requesting images for a plurality of items meeting search criteria according to an embodiment of the present invention.
Figure 12:
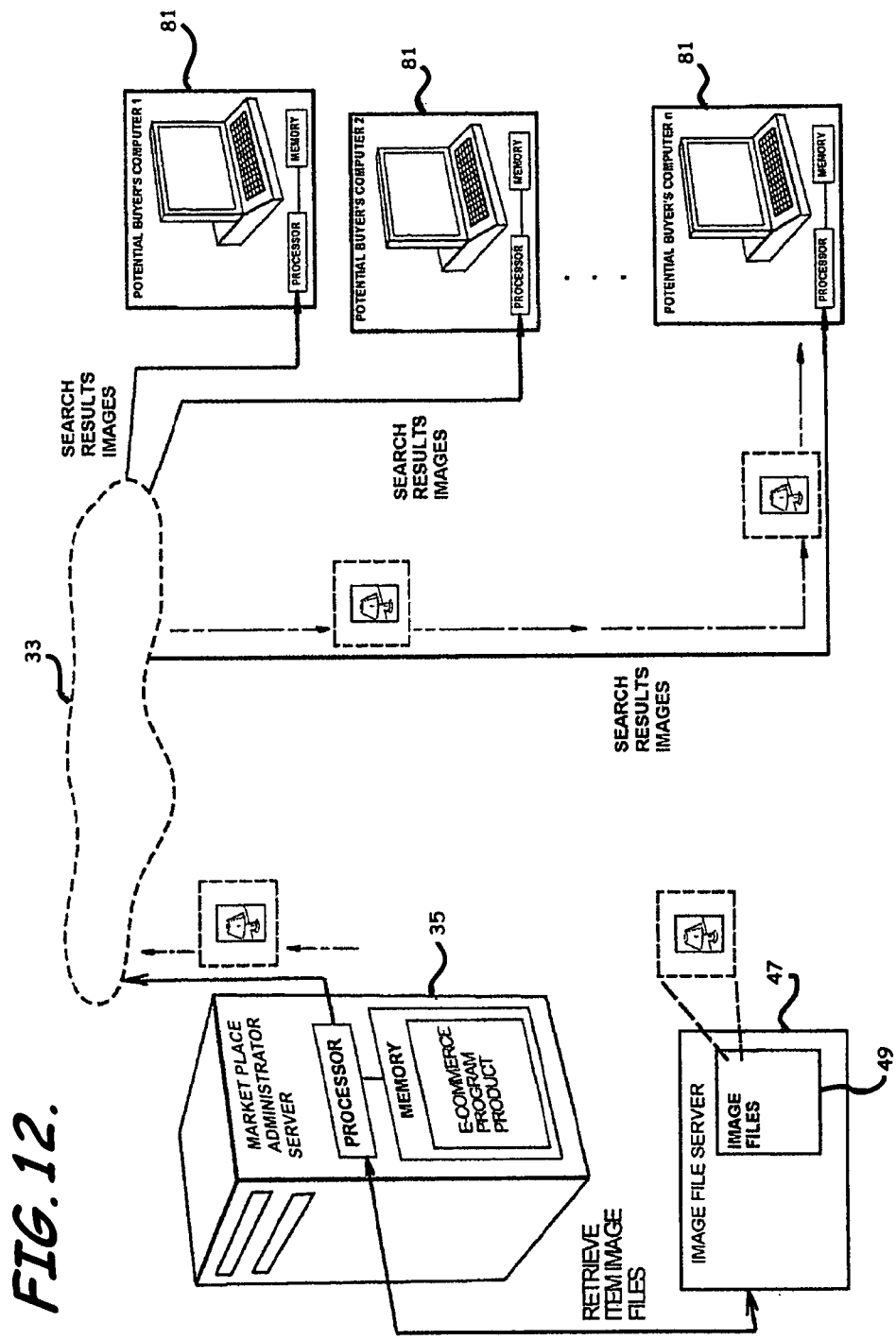
FIG. 12 is a schematic block diagram of a portion of a system to facilitate electronic commerce illustrating providing images for a plurality of items meeting search criteria according to an embodiment of the present invention.
Figure 13:
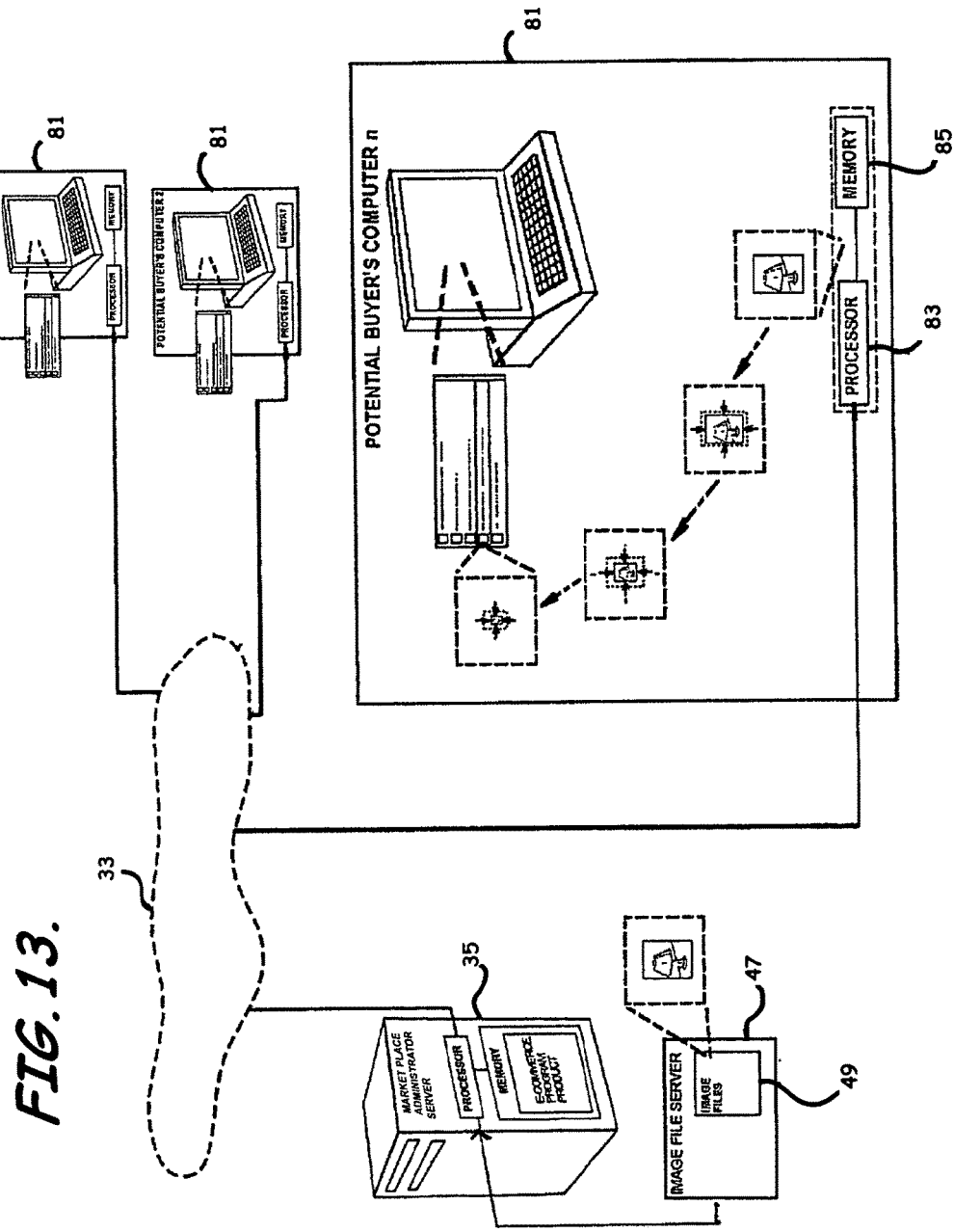
FIG. 13 is a schematic block diagram of a portion of a system to facilitate electronic commerce illustrating a potential buyer computer sizing a requested image according to an embodiment of the present invention.
Figure 14:
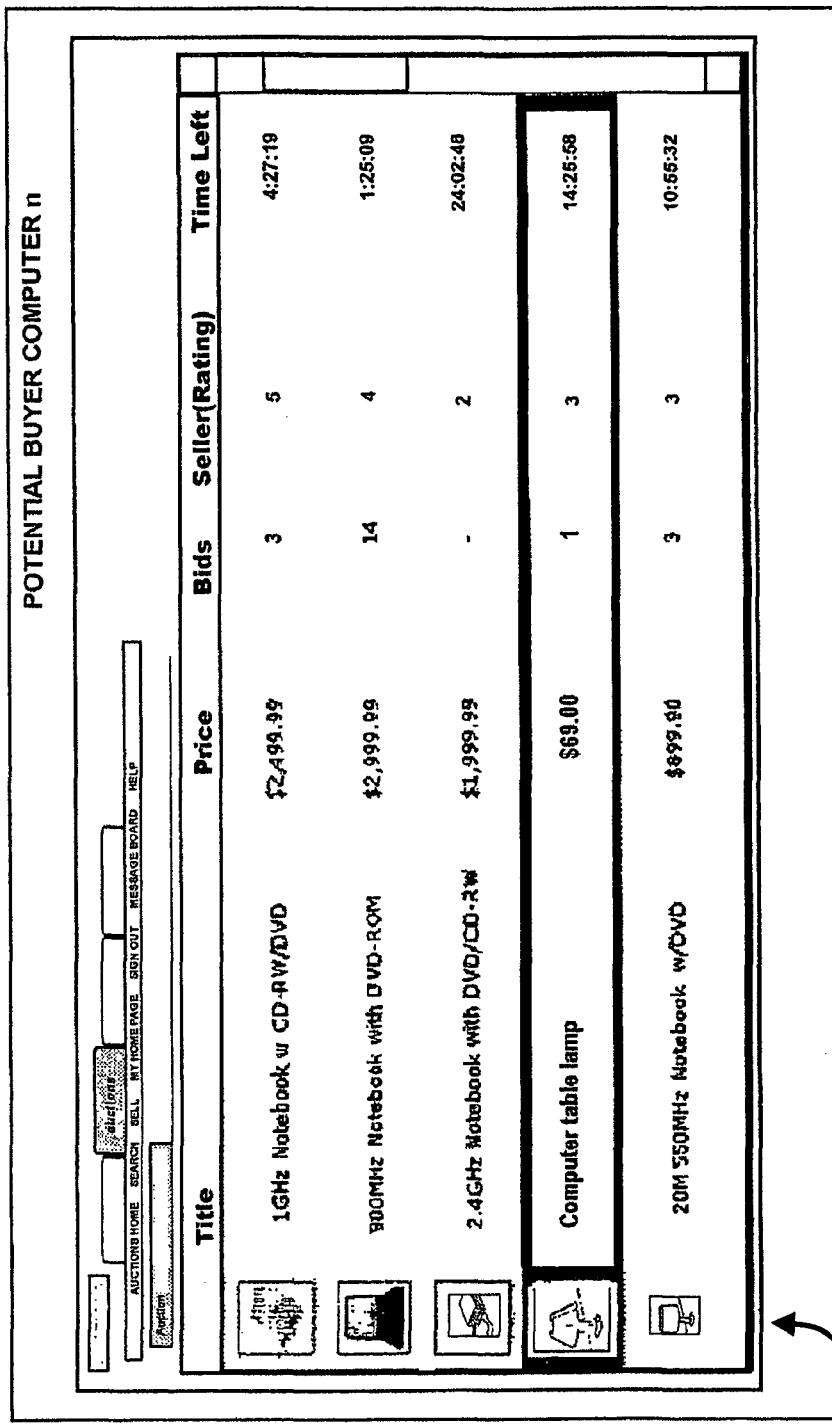
FIG. 14 is a schematic block diagram of a search results web page to facilitate electronic commerce according to an embodiment of the present invention.

Upon completion and submission of the marketplace-item-creation form, the data entered by the selling user is transmitted to and received by the seller marketplace item management server 51 (see FIG. 4) and a data record related to the marketplace item is stored by the seller marketplace item management server 51, for example, in the seller marketplace item management server database 57. The data can indicate immediate posting or can provide a scheduled posting time. As perhaps best shown in FIGS. 5 and 7, according to the selling user posting time selection, the seller marketplace item management program product instructions can include those to perform the operation of queuing each of the plurality of database records for sending to the marketplace administrator server 35, and sending each of the plurality of database records to the marketplace administrator server 35 in response to each respective scheduled item posting time. According to an embodiment the present invention, the original item image files each associated with one of the database records can be sent along with the associated database record (FIG. 7). According to another embodiment of the present invention, a location of the original item image file or files such as, for example, a respective uniform resource locator, can instead be provided within each associated database record (FIG. 5).

Figure 18:
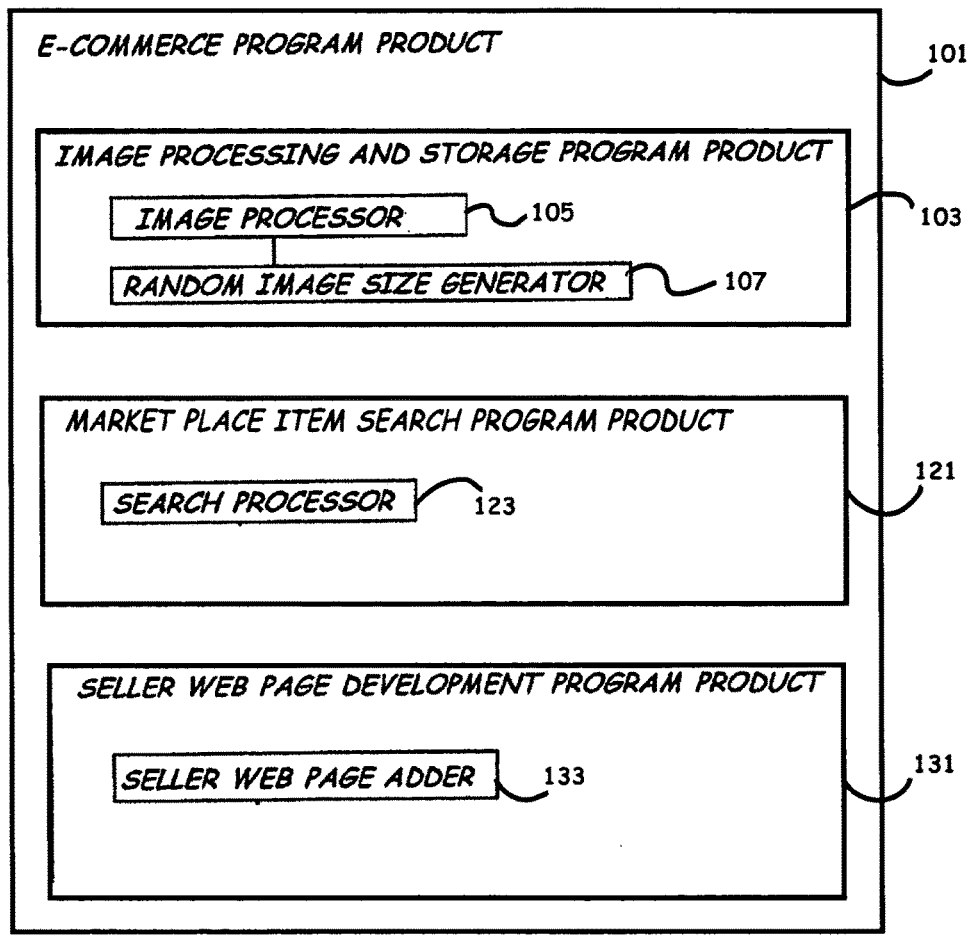
FIG. 18 is a schematic diagram illustrating use on an online auction-format web page of images selected from at least two scaled images and in different sizes and different places on the web page according to an embodiment of the present invention.

As shown in FIGS. 2 and 18, the system 30 can further include online e-commerce program product 101 stored, for example, in the memory 37 of the marketplace administrator server 35, which provides the server 35 the functionality to facilitate e-commerce through the online marketplace between the plurality of selling users and the plurality of potential buyers over a computer network 33. The online e-commerce program product 101 also includes functionality to allow multiple potential buyers to search for and access such data, view attributes of the marketplace items, and bid on or purchase such items. Note, the seller marketplace item management program product 91 and the e-commerce program product 101 can be in the form of microcode, programs, routines, and symbolic languages that provide a specific set or sets of ordered operations that control the functioning of the hardware and direct its operation, as known and understood by those skilled in the art. Note also, the seller marketplace item management program product 91 and the e-commerce program product 101, according to an embodiment of the present invention, need not reside in its entirety in volatile memory, but can be selectively loaded, as necessary, according to various methodologies as known and understood by those skilled in the art.

As shown in FIGS. 5-8, the online e-commerce program product 101 can include instructions that, when executed by the marketplace administrator server 35, cause the marketplace administrator server 35 to selectively perform various operations including receiving each of the plurality of database records from the seller marketplace item management server 51 over the network 33, storing each of the plurality of database records 45 in the marketplace administrator server database 43, and receiving or retrieving over the network 33 the original item image file for each of the plurality of marketplace items. The online e-commerce program product 101 can also include instructions to perform the operations of randomly generating or otherwise forming a set of at least two or more scaled item image files 49, and discarding the original image file. The image files 49 can be randomly generated within respective preselected viewable image size ranges and can provide image size variations of the item image of each respective marketplace item to thereby represent each respective marketplace item. The set of at least two item image files 49 can include a first item image file 49 providing a first image $I_1$ sized randomly based on a first preselected size range and a second item image file 49 providing a second image $I_2$ sized randomly based on a second preselected size range with the second image $I_2$ being substantially larger than the first image $I_1$.

The online e-commerce program product 101 also can include instructions to perform the operations of assigning each of the first and the second item image files 49 a unique name, storing each set of first and second image files 49 in the marketplace administrator image file server 47, storing the image name in the respective marketplace item database record 45 and in a look-up table of image file names which maps the image file server 47 storing the image files 49. The images file locations can be determined via a look-up table, organized by image name, which maps the image file server 47. The instructions can also include those for creating and presenting to a potential buyer computer 81 the seller marketplace item web page, described below.

Figure 15:
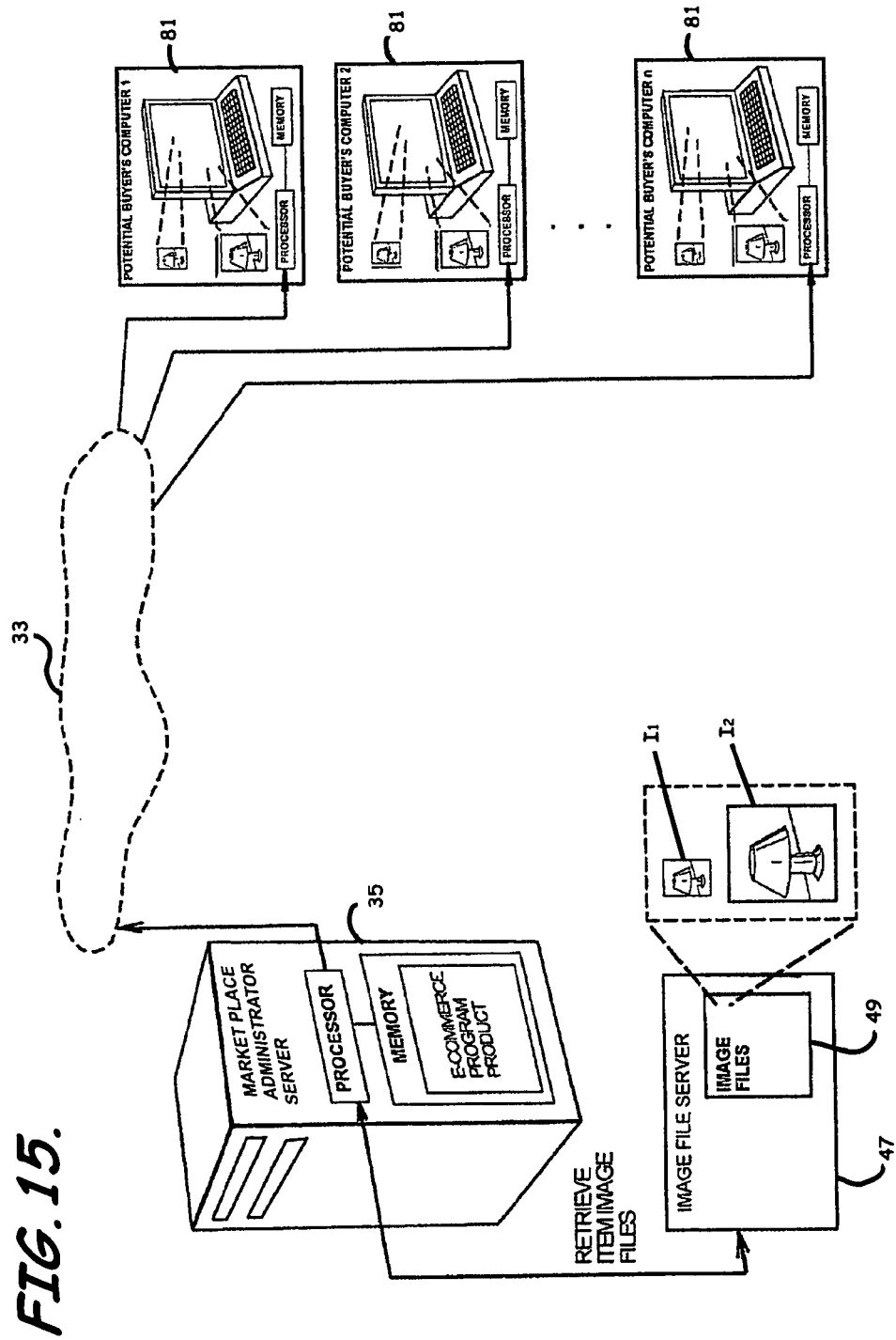
FIG. 15 is a schematic block diagram of a portion of a system to facilitate electronic commerce illustrating providing a potential buyer computer at least two randomly sized image files according to an embodiment of the present invention.
Figure 16:
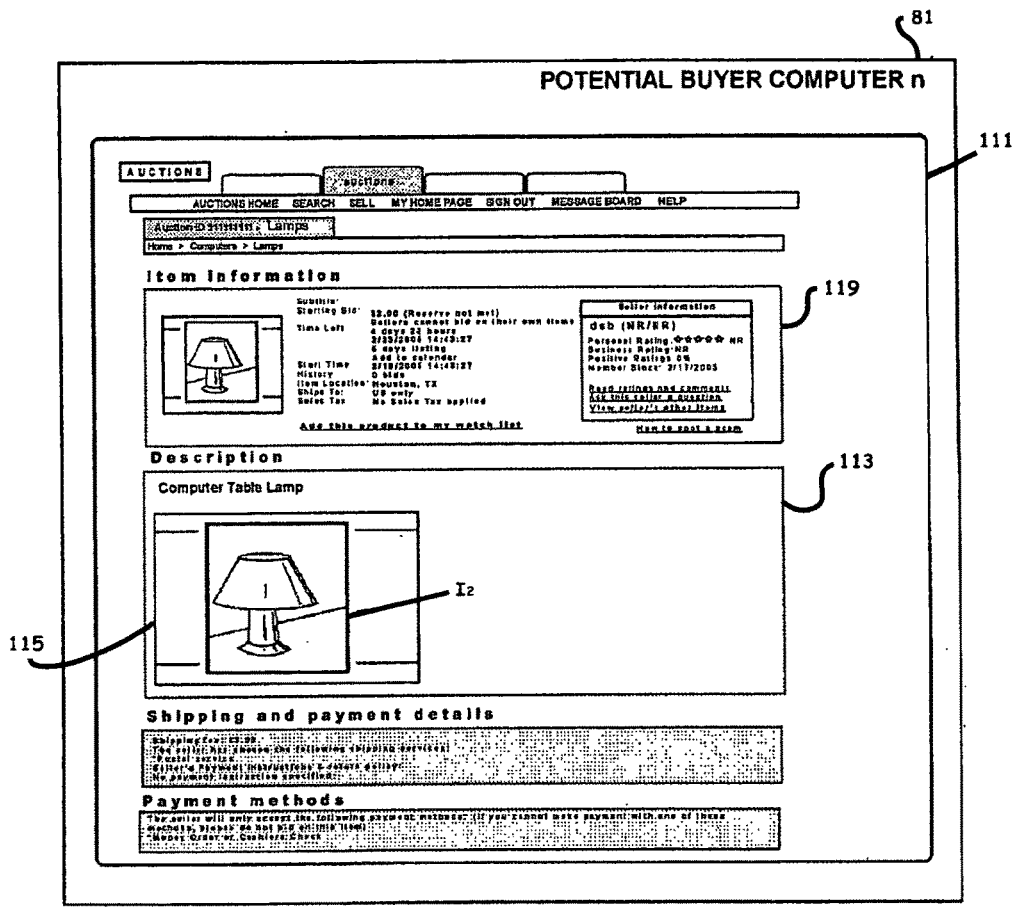
FIG. 16 is a schematic diagram of a seller of auction-format seller web page to facilitate electronic commerce over a computer network associated with an online marketplace between a plurality of selling users and a plurality of potential buyers according to an embodiment of the present invention.
Figure 17:
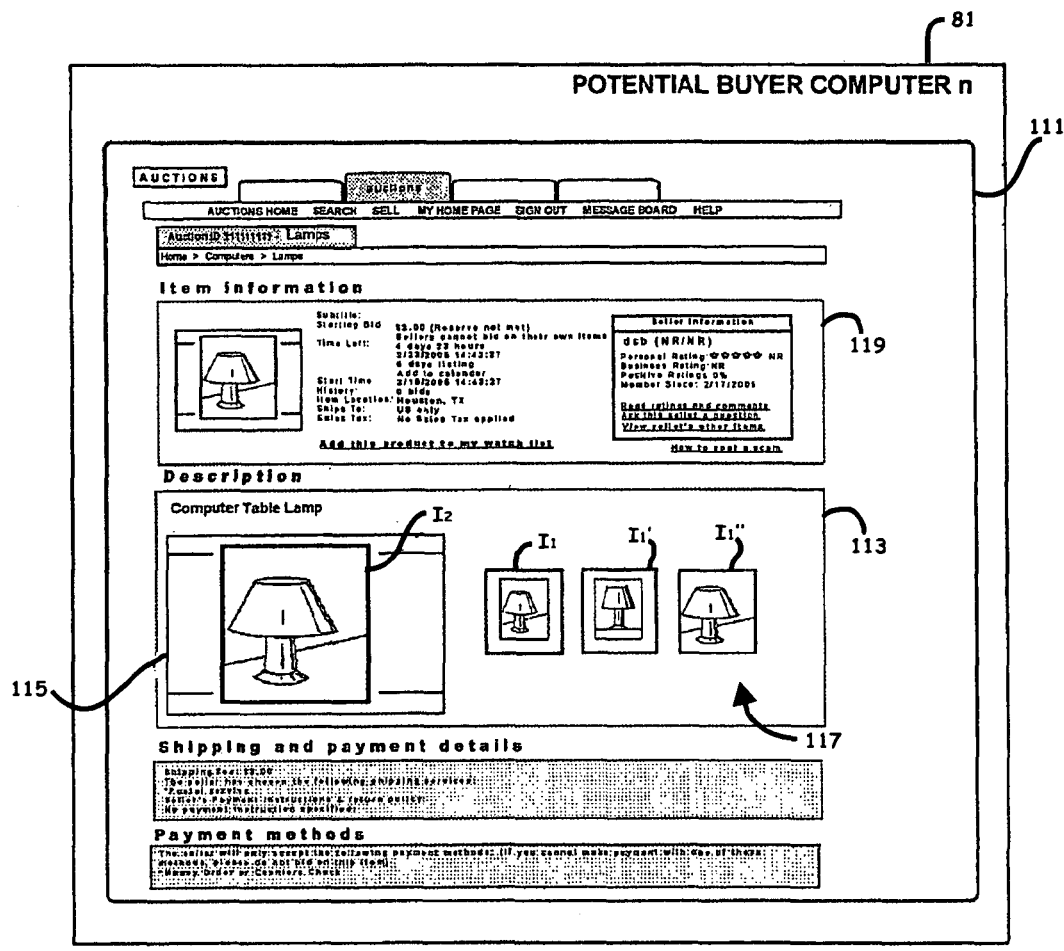
FIG. 17 is a schematic diagram of a seller of auction-format seller web page to facilitate electronic commerce over a computer network associated with an online marketplace between a plurality of selling users and a plurality' of potential buyers according to an embodiment of the present invention.

That is, for example, as perhaps best shown in FIGS. 15-17, the e-commerce program product 101 can include instructions to perform the operation of presenting the seller marketplace item web page 111 (see, e.g., FIGS. 16 and 17) and can include those to perform the operations of accessing one of the plurality of database records 45 (FIG. 1) in response to a received item identification number for a selected marketplace item to thereby determine a item title and description of the selected item and the item image file name for each of the first and the second item images of a selected marketplace item, determining a location of the first image $I_1$ associated the selected marketplace item and a location of the second image $I_2$ associated with the selected marketplace item using the look-up table organized by image name and in response to the accessing, and adding the image file location for the first and the second item image $I_1$, $I_2$, and associated title and description of the selected marketplace item to an associated seller marketplace item web page 111 to allow retrieval of the item images $I_1$, $I_2$, by the potential buyer computer 81 and the display of the seller marketplace item web page 111. Note, each seller marketplace item web page 111 can originate as a template whereby the specific item information and item images (image locations) can be added to the template to thereby "create" each individual seller marketplace item web page.

Note, according to embodiments of the present invention, the original item image files can be any type of digital image file that is capable of storing and transferring image data related to the auction item or other item for sale. Examples of suitable image files include Tagged Image File Format (TIFF), Joint Photographics Expert Group (JPEG), Audio Video Interleave (AVI), JPEG File Interchange Format (JFIF), Portable Network Graphics (PNG), Windows Bitmap Format (BMP), Portable Bitmap (PBM), Portable Greymap (PGM), Portable Pixmap (PPM), Adobe Photoshop (PSD), X BitMap (XBM), X PixMap (XPM), WordPerfect Graphics Metafile (WPG), Macintosh Picture (PICT), and the like. Other suitable types of image files will be apparent to those of skill in the art and are to be considered within the scope of the present invention. Note also, each of the images files in the set of at least two image files can be in the same format as that of the original image file, e.g., JPEG or GIF, so that if a JPEG image is provided, the at least two scaled image files can also be in JPEG.

According to an embodiment of the present invention, the seller marketplace item management program product 91 and the online e-commerce program product 101 are web-based programs that provide web-based functionality. Accordingly, beyond the installation of a common web browser, specialized software installation is not necessary. Because of such Internet-based functionality, such program products are portable to multiple computer systems and is easily accessible by multiple concurrent users at a single time through online access. As perhaps best shown in FIG. 18, the online e-commerce program product 101 can include various functional modules including, for example, image processing and storage program product 103 which further includes an image processor 105 and a random image size generator 107. The e-commerce program product can also include a marketplace item search program product 121 including a search processor 123 to provide database search functionality to the plurality of potential buyers, and a seller web page development program product 131 including a seller web page adder 133 to build the seller marketplace item web pages 111 in response to the provided marketplace item attributes and scaled image file or files.

The sets of at least two scaled item image files 49 can be produced in response to program instructions from the e-commerce program product 101 and/or an image processing and storage program product 103 stored in the memory 37 of the marketplace administrator server 35. As perhaps best shown in FIGS. 6 and 8, the sets of scaled first item image files 49 can provide categorical viewable image size variations of the original item image. The first item image $I_1$ can provide medium-sized image representing the item image of the marketplace item, and the second item image $I_2$ can provide a relatively large image representing the item image of the marketplace item.

In this embodiment of the present invention, the first item images $I_1$ of the image files 49 can range between 100 pixels by 100 pixels and 200 pixels by 200 pixels, preferably 100 pixels by 100 pixels and 125 pixels by 125 pixels, still more preferably 110 pixels by 110 pixels; and the second item images $I_2$ of the image files 49 can range between 150 pixels by 150 pixels and 650 pixels by 650 pixels, preferably 250 pixels by 250 pixels and 400 pixels by 400 pixels, more preferably 275 pixels by 275 pixels and 325 pixels by 325 pixels, still more preferably 300 pixels by 300 pixels. Note, according to this embodiment, the item images are not distorted to fit the ranges described above, but rather are scaled so that the widest portion of the item image fits within one of the above described ranges. Note also, above described image size ranges are presented by way of example according to various embodiments of the present invention and should not be interpreted as limiting the viewing sizes only to the described ranges. Note further, according to an embodiment of the present invention, the at least two image files 49 can additionally provide other image attribute variations of the item image of the respective marketplace item, such as, for example, brightness, contrast, color enhancements, or other picture qualities known to those skilled in the art.

According to an embodiment of the present invention, and as perhaps best shown in FIG. 17 and as noted above, the seller marketplace item web page 111 can provide item information such as, for example, an item identification number, title, subtitle, starting price, time remaining until expiration, start time, history, item location, shipping restrictions, and sales tax requirements. The seller marketplace item web page 111 also can provide a functional link to allow, e.g., the marketplace item, to be added to a potential buyer's watch list so that the potential buyer can monitor the status of the marketplace item, and a functional link to allow the item to be placed on a potential buyer's calendar so that the potential buyer can better visualize listing expiration dates for various items of interest to the potential buyer. This is an especially advantageous feature when the marketplace item is presented in an auction marketplace. The seller marketplace item web page 111 can also include selling user information including, for example, a personal rating, business rating, percent of positive ratings, repeat rating, membership status, ratings and comments about the selling user, and other information known to those skilled in the art. The seller marketplace item web page 111 further can include a link to the selling user to advantageously provide the potential buyer an ability to request additional information about the marketplace item. Further, advantageously, this functionality can provide a pre-formatted automated e-mail to the selling user whereby the subject, greeting, and/or closing are already provided and the potential buyer need only enter a question in a provided text entry field (not shown) in order to provide such question to the selling user.

In an embodiment of the present invention, in order to minimize the size of the seller marketplace item web page 111, an item description section 113 of the web page 111, for example, can provide a single large image viewing location 115 to display each large image $I_2$ provided to illustrate the marketplace item or items associated with the web page 111, and a separate location 117 (FIG. 17) for each associated small image $I_1$ when more than one image of the marketplace item or multiple marketplace items are associated with the web page 111. That is, as perhaps best shown in FIG. 17, the seller marketplace item web page 111 can display small images $I_1$, $I_1'$, $I_1''$, which function to allow a potential buyer to select and view the corresponding large image $I_2$, of each view represented by each of the small images, respectively. Also, each displayed small image $I_1$ and/or the displayed large image $I_2$, according to an embodiment of the system 30, can be presented in different sizes and different locations within the web page 111 as scaled by the browser of the potential buyer computer 81. Further, in order to standardize the layout of the various seller marketplace item web pages 111 among different selling users, in an embodiment of the present invention, an item information section 119 is provided that includes a standardized image, e.g., of the first uploaded marketplace item, preferably in the form of the large item image $I_2$ but adjusted to a standard size such as, for example, preferably 125 pixels by 125 pixels to 175 pixels by 175 pixels, and more preferably 150 pixels by 150 pixels.

In order for a potential buyer to readily access the seller marketplace item web page 111, the system 30 through the online marketplace, for example, can provide the potential buyer a keyword or item number search function whereby the potential buyer may enter search criteria (see FIG. 9) such as key words matching those, for example, in an item's title, subtitle, or description, or the item number of the item assigned to the respective item by the marketplace administrator server 35. This search can be conducted in either all predetermined item categories or a subset thereof. The online marketplace can also provide the potential buyer a search function based on selling user identification (e.g. user name) which can display all items associated with a particular selling user. The online marketplace can further provide the potential buyer a refined keyword or item number search function, whereby the potential buyer is further provided search limiting fields such as, for example, minimum price, maximum price, item category, and/or selling user identification.

In response to receiving the search criteria presented by a potential buyer web browser, the e-commerce program product 101, e.g., through the marketplace administrator server 35, can access the item data records 45 of a respective plurality of items satisfying the search results criteria to thereby determine various attributes, such as, for example, an associated item title for each of the plurality of items satisfying the search results criteria and an item image file name of an item image file associated with each of the items satisfying the search results criteria. Using the name and the lookup table, described previously, the location of one or both of the item images $I_1$, $I_2$, for each respective marketplace item can be readily determined.

Having determined the attribute data and the image location and/or identification of at least one of the item image files associated therewith for each of the of items satisfying the search results criteria, the e-commerce program product 101, through the marketplace administrator server 35, can provide such data to the potential buyer web browser along with instructions (see FIG. 10) to display a search results web page 112 (see, e.g., FIG. 14) including those to display within the search results web page 112, for example, each item title and at least one of the item images $I_1$, $I_2$, for each item image satisfying the search criteria. The potential buyer web browser can then request and be provided each of the item images for each item image satisfying the search criteria according to the provided instructions (see FIGS. 11-12). According to the provided instructions, the potential buyer web browser can then resize the provided item images (see FIG. 13) to be displayed in a table of items satisfying the search results criteria (see FIG. 14).

Regardless of search methodology employed, according to an embodiment of the present invention, the search results web page 112 can include, for example, a standardized layout of the various items provided by different selling users. This search results web page 112 can further include hyperlinks to each of the various seller marketplace item web pages 111 satisfying the search methodology criteria associated with the respective titles of the items. The search results can also include icons 120 each providing a hyperlink to each respective seller marketplace item web page 111 having an item satisfying the search methodology criteria. Each icon can be displayed in the form of one of the at least two item images $I_1$, $I_2$, for each respective seller marketplace item web page 111, adjusted to a standard size such as, for example, 65 pixels by 65 pixels. As shown in FIGS. 15-17, upon access of either hyperlink by the potential buyer, a seller marketplace item web page 111 associated with the selected image is presented, the respective item data is received, and the item images, for example, images $I_1$, $I_2$ are retrieved and displayed. Note, as shown in FIGS. 16 and 17, one or more of the large and/or small item images $I_1$, $I_2$, can be resized for use in different sizes in different locations on the seller marketplace item web page 111, in conformity with the potential buyer web browser. Note, multiple selling users can upload an original item image file or an image file location of an image file displaying an item image of a marketplace item to be received and/or retrieved by the seller marketplace item management server 51 and provided to various online marketplaces including the marketplace hosted by the marketplace administrator server 35.

As shown in FIGS. 1-22, embodiments of the present invention advantageously provide methods of facilitating e-commerce between a plurality of selling users (e.g., selling user computers 71) and a plurality of potential buyers (e.g., potential buyer computers 81) over a computer or other type of communication network 33. In an embodiment of a method of facilitating e-commerce a marketplace-item-creation form for selling a marketplace item is presented to a selling user web browser over the communication or computer network 33. A selling user, preferably a previously registered user, accesses through the selling user computer 71 the marketplace-item-creation form accessible through an seller marketplace item management website's remote seller marketplace item management server 51, to thereby create a seller marketplace item web page 111 (see, e.g., FIG. 17). The selling user begins entering data in the marketplace-item-creation form to develop the seller marketplace item web page 111 to thereby provide information for one or more associated marketplace items or items for sale. Note, although illustrated and described with respect to providing auction services, embodiments of the present invention are equally applicable to direct product/service sales.

Figure 19:
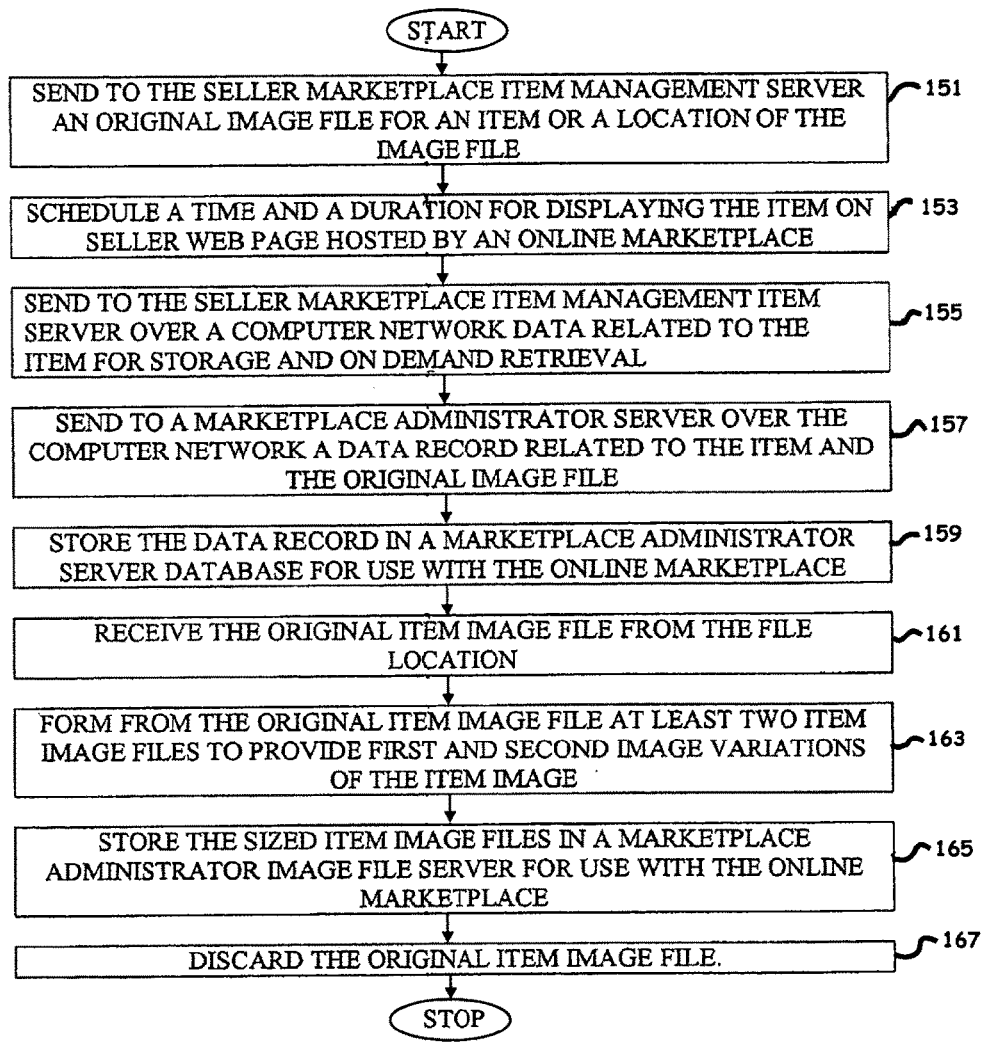
FIG. 19 is a block flow diagram illustrating a method of facilitating electronic commerce on an online marketplace over a computer network according to an embodiment of the present invention.
Figure 20:
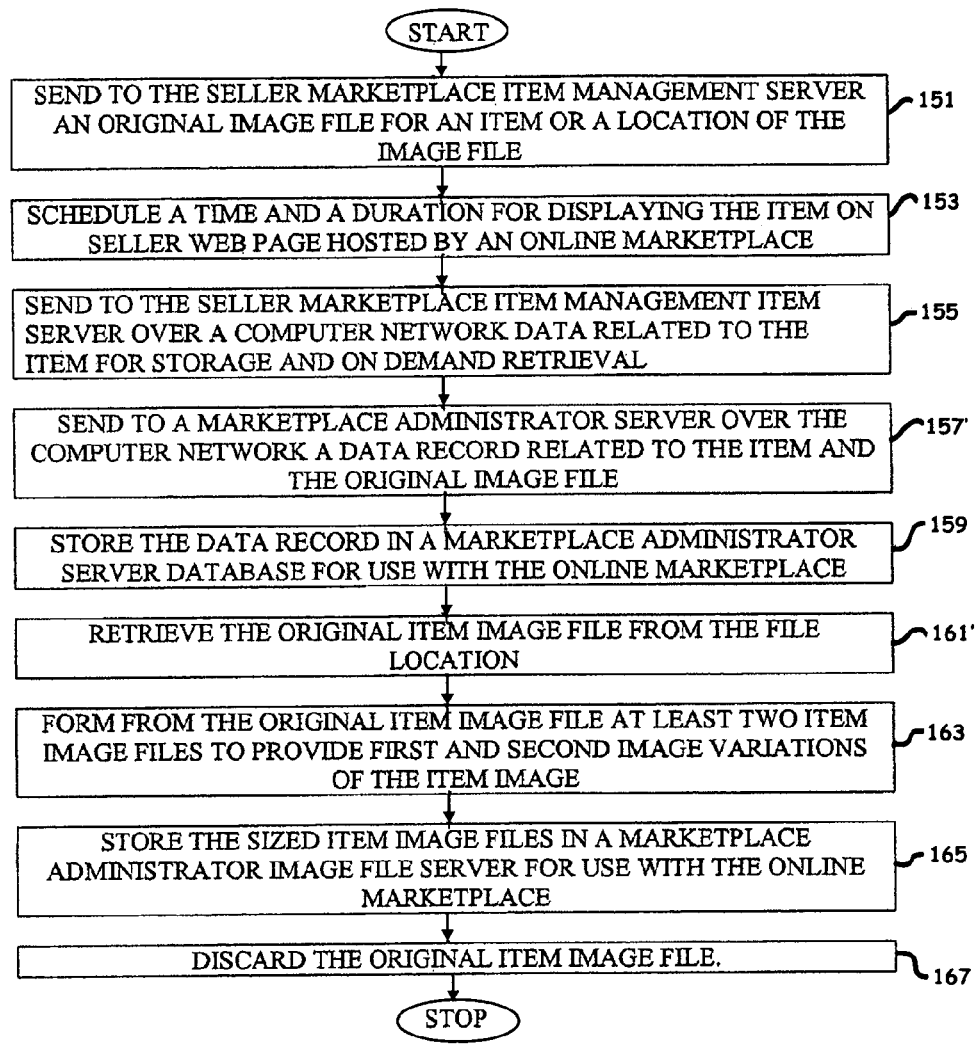
FIG. 20 is a block flow diagram illustrating a method of facilitating electronic commerce on an online marketplace over a computer network according to an embodiment of the present invention.
Figure 21:
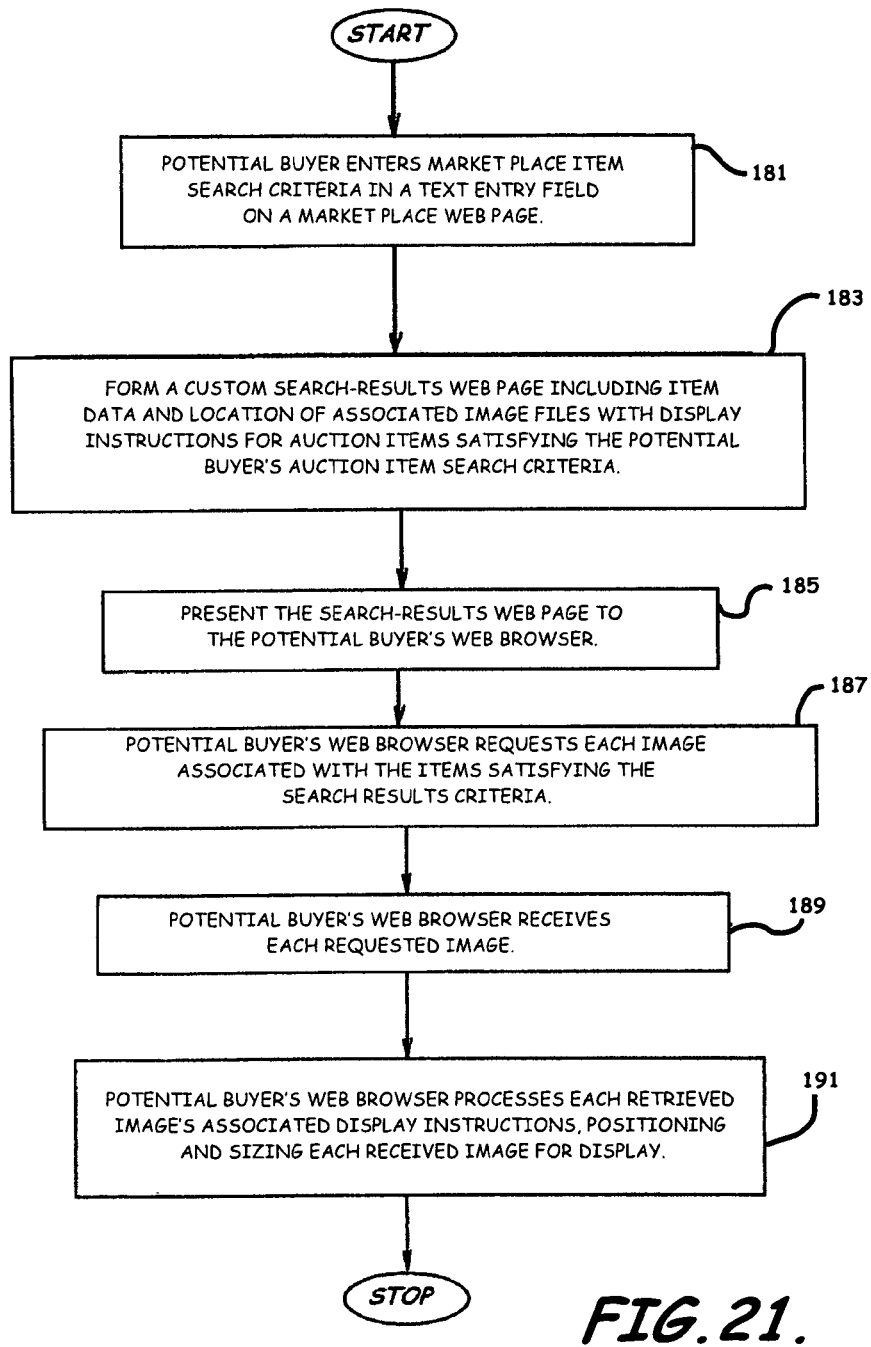
FIG. 21 is a block flow diagram illustrating a method of facilitating electronic commerce on an online marketplace over a computer network between a selling user computer and a potential buyer computer over a computer network according to an embodiment of the present invention.

As shown in FIGS. 19 and 20, during form completion, the selling user selects or otherwise uploads or otherwise sends an item image file, e.g. image file displaying an image of the marketplace item (block 151) or image file location to be received by the seller marketplace item management server 51 (see also FIG. 3). This original item image file can be identified by file location or address within a selling user computer 71 associated storage device or uniform resource locator associated with either a seller website or that of a third-party service provider. The method can also include scheduling a time and a duration for displaying a marketplace item on a seller marketplace item web page 111 hosted by the online marketplace (block 153), and sending to the seller marketplace item management server 51 the data related to the marketplace item or item entered in the marketplace-item-creation form for on-demand retrieval (block 155). The data can include a title and a description of the marketplace item or items and a location of an original item image file of each marketplace item, which includes an item image of the respective marketplace item. The method also includes sending by the seller marketplace item management server 51 over the computer network 33 a database record related to the marketplace item and an associate original image file to a marketplace administrator server 35 (block 157), storing the database record related to the marketplace item in a marketplace administrator server database 43 for use on the online marketplace (block 159), and receiving the original item image file of the marketplace item through the computer network 33 (block 161). According to another embodiment of the present invention, as shown in FIG. 20, rather than send the original image file, the file location, e.g., URL, can be included with the database record (block 157). Correspondingly, the original item image is retrieved by the marketplace administrator server 35 using the provided image location (block 161).

As shown in FIGS. 19 and 20, the method also includes forming a set of at least two item image files from the original item image file to provide image size variations of the item image to represent the marketplace item. The set of the at least two item image files including a first item image file providing a first image $I_1$ and a second item image file providing a second image $I_2$ sized substantially larger than the first image $I_1$ (block 163). The at least two item image files are then stored in a marketplace administrator image file server 47 (block 165) for use on the online marketplace and the original image file or files are discarded (block 167) to conserve memory and reduce storage requirements. The at least two item image files can advantageously provide categorical image size variations of the item image of each marketplace item. The first item image $I_1$ can be randomly sized based on a first preselected size range and the second image $I_2$ can be randomly sized based on a second preselected size range, which can be substantially larger than the first.

When used in a seller marketplace item web page 111, one of the item images $I_1$, when selected by a potential buyer utilizing an input device for a potential buyer computer 81, can function as an icon selectable to send commands to the potential buyer computer 81 and/or remote marketplace administrator server 35 to display another one of the at least two image files $I_2$, to thereby display to the potential buyer an enlarged image of the marketplace item or items. The method can also include providing in the seller marketplace item web page 111 selling user information including, for example, a personal rating, business rating, percent of positive ratings, repeat rating, membership status, ratings and comments about the selling user, and other information known to those skilled in the art. The method can further include providing a link to the selling user within the seller marketplace item web page 111 to advantageously provide the potential buyer an ability to request additional information about the item. Advantageously, as described previously, this functionality can provide a preformatted automated e-mail to the selling user whereby the subject, greeting, and/or closing are already provided and the potential buyer need only enter a question in a provided text entry field (not shown) in order to provide such question to the selling user.

As shown in FIGS. 9-14 and 21, according to an embodiment of the present invention, provided is a method for facilitating e-commerce between a plurality of selling users and a plurality of potential buyers over a computer network which includes providing a potential buyer a keyword or item number search function whereby the potential buyer may either enter key words matching those in, for example, an item's title, subtitle, or description; or the item number of the item assigned to the respective item by the system 30, or other relational attributes such as, for example, minimum price, maximum price, item category, and/or selling user identification.

In response to receiving the search criteria (see FIG. 9) entered or otherwise presented by a potential buyer web browser (block 181), the system 30 can form (block 183) and present to the potential buyer (block 185) a custom search results web page 112 including a list of items satisfying the search results criteria including various attributes, such as an associated item title, for each of the items satisfying the search results criteria, and can include an item image file name or location of an associated marketplace item image file for each of the items satisfying the search results criteria, if provided by the respective selling user when completing the marketplace-item-creation form, described above, along with display instructions (see FIG. 10). The potential buyer web browser can then request and be provided at least one of the item images $I_1$, $I_2$, for each item image satisfying the search criteria (block 187) according to the provided instructions (see FIGS. 11-12). Upon receipt of the images (block 189), according to the provided instructions, the potential buyer web browser can then position and resize the provided item images (block 191) to be displayed in a table of items satisfying the search results criteria (see FIGS. 13-14).

Figure 22:
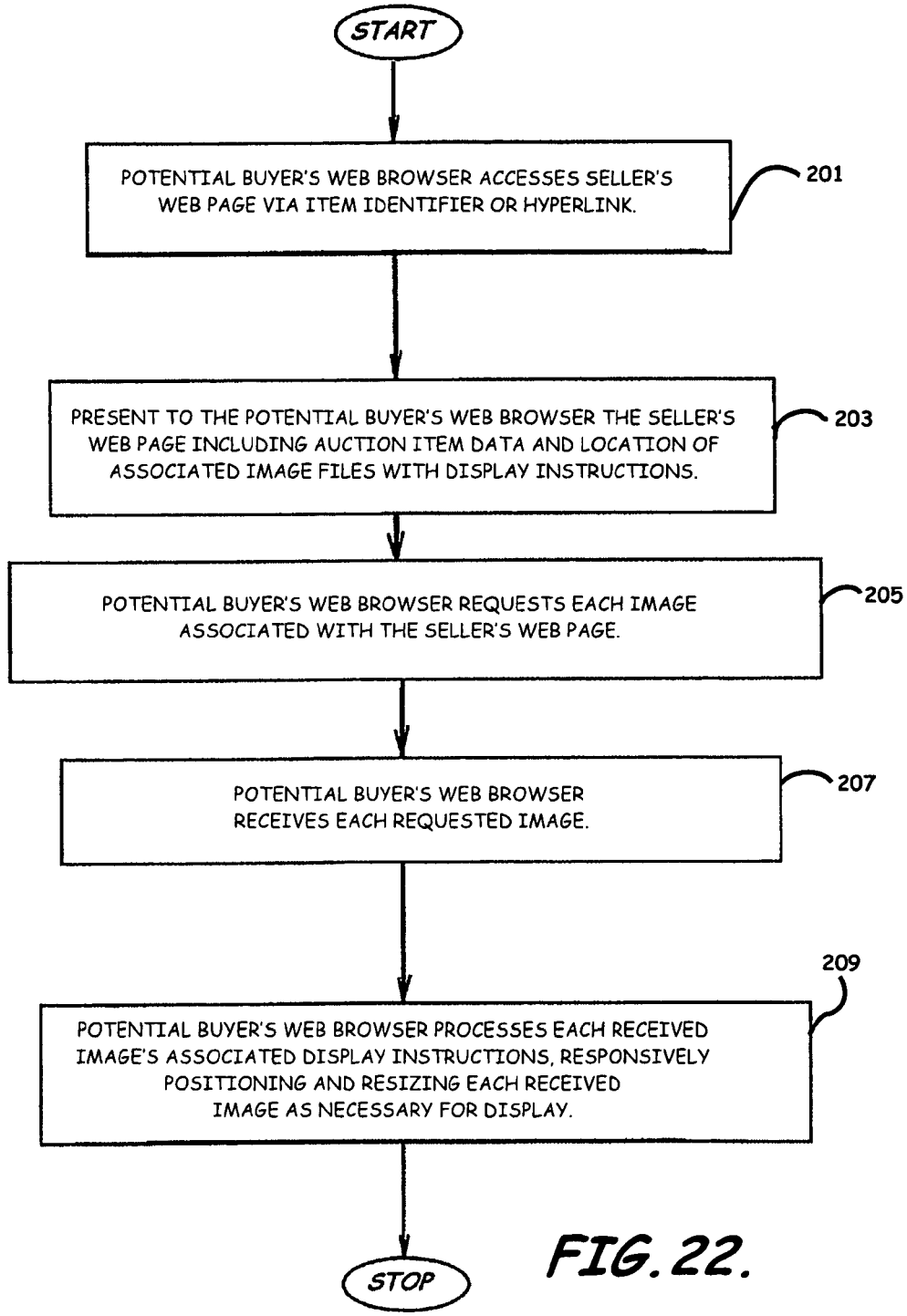
FIG. 22 is a block flow diagram illustrating another method of facilitating electronic commerce at an online marketplace between a selling user computer and a potential buyer computer over a computer network according to an embodiment of the present invention.

As shown in FIG. 22, the method can also include providing the search results web page 112 such that it includes a standardized layout of the different items provided by different selling users in accordance with the search criteria. This search results web page 112 can be developed to include hyperlinks to each of the various seller marketplace item web pages 111 satisfying the search criteria associated with the respective titles of the items, and/or icons 120 each providing a hyperlink to each respective seller marketplace item web page 111 associated with an item satisfying such search criteria (201). Each icon can be displayed in the form of one of an item image, e.g., image $I_1$, $I_2$, adjusted to a standard size. As shown in FIGS. 15-17, upon access of either hyperlink by the potential buyer, a seller marketplace item web page 112 associated with the selected image can be presented along display instructions for marketplace item data and display and retrieval instructions for associated item images $I_1$, $I_2$, (block 203). The potential buyer web browser, and response to the instructions, can request each image $I_1$, $I_2$, (block 205), receive each image $I_1$, $I_2$, (block 207) and process received image display instructions, positioning and resize in each image $I_1$, $I_2$, as necessary for display.

It is important to note that while embodiments of the present invention have been described in the context of a fully functional system, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links.

As shown in FIGS. 1-22, embodiments of the present invention include a computer readable medium that is readable by a computer to facilitate e-commerce between a plurality of selling users (selling user computers) and a plurality of potential buyers (potential buyer computers) over a computer network as described above, particularly with respect to the program product and the computer executable method steps, described above. For example, according to an embodiment of the present invention, a computer readable medium that is readable by a computer facilitating electronic commerce between a selling user computer and a potential buyer computer in a computer network is provided.

The computer readable medium can include a set of instructions that, when executed by the computer, such as, for example, a marketplace administrator server, cause the computer to perform the operations of receiving a plurality of database records related to a corresponding plurality of marketplace items over the computer network 33 from a seller marketplace item management server 51, receiving through the computer network 33 a separate original item image file for each of the plurality of marketplace items, and forming a set of at least two item image files from each of the original item image files to provide image size variations of each respective item image to thereby represent each respective marketplace item. Each set of at least two item image files can include a first item image file providing a first image $I_1$ sized randomly based on a first preselected size range and a second item image file providing a second image $I_2$ substantially larger than the first image and sized randomly based on a second preselected size range. The first preselected size range can be, for example, between approximately 100 pixels by 100 pixels and 200 pixels by 200 pixels, preferably 100 pixels by 100 pixels and 125 pixels by 125 pixels, still more preferably 110 pixels by 110 pixels. The second preselected size range can be, for example, between approximately 150 pixels by 150 pixels and 650 pixels by 650 pixels, preferably 250 pixels by 250 pixels and 400 pixels by 400 pixels, more preferably 275 pixels by 275 pixels and 325 pixels by 325 pixels, still more preferably 300 pixels by 300 pixels.

The instructions can also include those to perform the operations of storing the first and the second item image files in a marketplace administrator image file server 47 for on demand retrieval and display through an online marketplace, discarding the original image file in response to forming the respective set of at least two item image files to reduce marketplace administrator image file server storage requirements. The instructions can also include those to perform the operations of storing the name of the image files $I_1$, $I_2$, in both an associated database records 45 and in a lookup table mapping the marketplace administrator image file server 47.

According to an embodiment of the present invention, the instructions can include those to perform the operation of adding to a seller marketplace item web page, e.g., web page 111, an image file location for each of the first and the second item images $I_1$, $I_2$, of at least one of the sets of at least two item image files. Correspondingly, the instructions also include those to perform the operations of receiving an item identification number identifying the marketplace item, and accessing an item database record for the marketplace item in response to receiving the item identification number, to thereby access an associated title and description of the marketplace item and to thereby access an item image file name for each of the first and second images $I_1$, $I_2$, associated with the marketplace item. The instructions also include those to perform the operation of determining a location of the first image $I_1$ (image file) associated with the marketplace item and a location of the second image $I_2$ (image file) associated with the marketplace item, in responsive to the accessing, using a look-up table organized by image file name.

In the drawings and specification, there have been disclosed a typical preferred embodiment of the invention, and although specific terms are employed, the terms are used in a descriptive sense only and not for purposes of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

What is claimed is:

1. A system to facilitate electronic commerce associated with an online marketplace between a plurality of selling users and a plurality of potential buyers over a computer network, the system comprising:
   a first computer accessible to the computer network to host the online marketplace to thereby define a marketplace administrator server, the marketplace administrator server having a processor and memory coupled to the processor to store operating instructions therein;
   a marketplace administrator server database accessible to the processor of the marketplace administrator server and having database records related to a plurality of marketplace items by the plurality of selling users, each item database record including a unique item identification number, item title, item description, and at least two unique item image file names corresponding with at least two associated item image files;
   a marketplace administrator image file server accessible to the processor of the marketplace administrator server and having image files related to the plurality of items to be sold by the plurality of selling users, each image file having a unique image file name;
   a lookup table organized by image file name accessible to the processor of the marketplace administrator server and mapping image files stored in the image file server;
   a second computer positioned remote from the marketplace administrator server and each of the plurality of selling users and accessible to the computer network to provide seller marketplace item management services to the plurality of selling users to thereby define a seller marketplace item management server, the seller marketplace item management server having a processor and memory coupled to the processor to store operating instructions therein;

a seller marketplace item management server database accessible to the processor of the seller marketplace item management server and having database records related to the plurality of marketplace items to be sold by the plurality of selling users;

a seller marketplace item management image file server accessible to the processor of the seller marketplace item management server and having image files related to the plurality of marketplace items to be sold by the plurality of selling users;

a plurality of seller user computers each positioned at a separate seller user site remote from the marketplace administrator server and the seller marketplace item management server, accessible to the computer network and having a processor and memory coupled to the processor to store operating instructions therein, each seller user computer positioned to transmit data related to a marketplace item including an item title, item description, and scheduled item posting time and duration, and positioned to transmit a uniform resource locator providing an address for an original item image file including an item image of the marketplace item;

a plurality of potential buyer computers each positioned at a separate potential buyer user site remote from the marketplace administrator server and seller marketplace item management server, and each accessible to the computer network to access a plurality of seller marketplace item web pages through the computer network;

seller marketplace item management program product stored in the memory of the seller marketplace item management server to facilitate seller marketplace item management between the plurality of selling users and the online marketplace, the seller marketplace item management program product including instructions that, when executed by the seller marketplace item management server, cause the seller marketplace item management server to perform the operations of:

receiving data related to a respective one of a plurality of marketplace items, defining database record data from each of the plurality of seller user computers over the computer network, storing in the seller marketplace item management server database the database record data received from each of the plurality of seller user computers to define a corresponding plurality of database records, queuing each of the plurality of database records for sending to the marketplace administrator server, and sending each of the plurality of database records to the marketplace administrator server, responsive to each respective scheduled item posting time; and an online e-commerce program product stored in the memory of the marketplace administrator server to facilitate electronic commerce over the computer network between the plurality of selling users and the plurality of potential buyers, the online e-commerce program product including instructions that, when executed by the marketplace administrator server, cause the marketplace administrator server to perform the operations of:

receiving each of the plurality of database records from the seller marketplace item management server over the network, storing each of the plurality of database records in the marketplace administrator server database, receiving over the network the original item image file for each of the plurality of marketplace items, forming from each of the original item image files a set of at least two item image files to provide image size variations of the item image of each respective marketplace item to thereby represent each respective marketplace item, the set of at least two item image files including a first item image file providing a first image sized randomly based on a first preselected size range and a second item image file providing a second image sized randomly based on a second preselected size range, the second image being substantially larger than the first image, storing each set of first and second item image files in the marketplace administrator image file server, each of the first and the second item image files assigned a unique name, accessing one of the plurality of database records responsive to a received item identification number for a selected marketplace item to thereby determine an item title and description of the selected marketplace item and the item image file name for each of the first and the second item images of the selected marketplace item, determining a location of the first image associated the selected marketplace item and a location of the second image associated with the selected marketplace item using the look-up table organized by image name responsive to the accessing, and adding the image file location for the first and the second item image and associated title and description of the selected marketplace item to an associated seller marketplace item web page;

wherein the seller marketplace item management program product and the online e-commerce program product are accessible to multiple concurrent users at a single time.

2. A system as defined in claim 1, wherein the seller marketplace item program product further includes instructions to perform the operation of sending each of the plurality of the original item image files to the marketplace administrator server responsive to each respective scheduled item posting time.

3. A system as defined in claim 1, wherein each of the plurality of database records received over the computer network from the seller marketplace item management server includes a uniform resource locator providing an address for the original item image file of the respective marketplace item;

wherein the seller marketplace item management program product further includes instructions to perform the operations of:

receiving over the computer network the plurality of original item image file each relating to one of the plurality of marketplace items, each original item image file including an item image of the respective marketplace item, and storing the plurality of original item image files in the seller marketplace item management image file server; and wherein the instructions to perform the operation of receiving over the network the original item image file for each of the plurality of marketplace items further includes those to perform the operations of:
retrieving the original item image file for each of the plurality of marketplace items responsive to receipt of the respective uniform resource locator, and
discarding each original image file responsive to forming each respective set of at least two item image files to reduce marketplace administrator image file server storage requirements.

4. A system as defined in claim 1, wherein each of the plurality of potential buyer computers includes a potential buyer web browser;
wherein the online e-commerce program product further includes instructions to perform the operations of:
receiving search criteria presented by a potential buyer web browser,
accessing a plurality of marketplace item database records of a respective plurality of marketplace items satisfying the search results criteria responsive to the search criteria to thereby determine an associated item title for each of the plurality of marketplace items satisfying the search results criteria and an item image file name of a first item image of the at least two item image files for each of the plurality of marketplace items satisfying the search results criteria,
determining the item title and the image location of the first item image associated therewith for each of the plurality of marketplace items satisfying the search results criteria,
providing data to the potential buyer web browser, the data including the item title and the image location of the first item image associated therewith for each of the plurality of items satisfying the search results criteria and instructions to display a search results web page including those to display within the search results web page each item title and each first item image,
receiving a request from the potential buyer web browser for each respective first item image of each of the plurality of items satisfying the search results criteria, and
providing to the potential buyer web browser each requested first item image; and wherein the first image is substantially larger than a thumbnail sized image defined as an image including an image size having a maximum of approximately 96 pixels by 96 pixels.

5. A system as defined in claim 1, wherein the first image is larger than 100 pixels by 100 pixel.

* * * * *